US012241231B2

(12) United States Patent
Harada

(10) Patent No.: US 12,241,231 B2
(45) Date of Patent: Mar. 4, 2025

(54) CONSTRUCTION MACHINE

(71) Applicant: Yanmar Holdings Co., Ltd., Osaka (JP)

(72) Inventor: Takahiro Harada, Fukuoka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 0 days.

(21) Appl. No.: 17/750,180

(22) Filed: May 20, 2022

(65) Prior Publication Data
US 2022/0372731 A1    Nov. 24, 2022

(30) Foreign Application Priority Data

May 24, 2021    (JP) .................................. 2021-087235

(51) Int. Cl.
*E02F 9/22*    (2006.01)
*E02F 9/02*    (2006.01)

(52) U.S. Cl.
CPC .............. *E02F 9/2275* (2013.01); *E02F 9/02* (2013.01)

(58) Field of Classification Search
CPC ..... E02F 9/2275; E02F 9/0808; E02F 9/0858; E02F 9/121; B62D 55/084; B62D 55/06; B60Y 2200/412
USPC ....................................................... 280/781
See application file for complete search history.

(56) References Cited

U.S. PATENT DOCUMENTS

| | | | |
|---|---|---|---|
| 7,007,416 B2 * | 3/2006 | Yonetake | E02F 9/2275 37/466 |
| 9,132,870 B2 * | 9/2015 | Smith | B62D 55/06 |
| 9,732,497 B2 * | 8/2017 | Miyata | B60K 7/0023 |
| 2009/0284000 A1 * | 11/2009 | Takano | E02F 9/02 29/897.2 |

FOREIGN PATENT DOCUMENTS

| | | | | |
|---|---|---|---|---|
| EP | 3812516 A1 | * | 4/2021 | ............. E02F 9/024 |
| JP | 2011074605 A | * | 4/2011 | |
| JP | 2013129997 A | * | 7/2013 | |

* cited by examiner

*Primary Examiner* — Paul N Dickson
*Assistant Examiner* — Tiffany L Webb
(74) *Attorney, Agent, or Firm* — Chris Mizumoto

(57) ABSTRACT

A lower travel body that supports an upper unit includes: a center frame that supports the upper unit; a side frame that is provided on both of right and left sides of the center frame to support a travel motor and constitutes a crawler-type travel section; and a plurality of hydraulic hoses, one end side of each of which is connected to a swivel joint provided to the center frame, and the other end side of each of which is connected to the travel motor. The center frame includes: a rear wall having a guide hole, through which the plurality of hydraulic hoses passes; and a hose guide that is located below the guide hole, located above the hydraulic hoses, and thereby restricts upward movement of the hydraulic hoses.

7 Claims, 13 Drawing Sheets

CONSTRUCTION MACHINE

CROSS-REFERENCE

This application claims foreign priority of JP2021-087235 filed May 24, 2021, the disclosure of which is hereby incorporated by reference in its entirety.

TECHNICAL FIELD

The present invention relates to a construction machine that has a travel motor in each of travel sections provided on both of right and left sides of a center frame in a lower travel body, the travel motor being connected to a hydraulic hose that extends from the center frame side.

BACKGROUND ART

Conventionally, for example, there is a construction machine, such as an excavation work machine, that has a travel motor in each of travel sections provided on both of right and left sides of a center frame in a lower travel body, and the travel motor is connected to a hydraulic hose that extends from a side of the center frame for supporting an upper turning body. On each of the right and left sides of the center frame, the travel motor is provided in a rear end portion of a crawler-type travel section extending in a front-rear direction, and the plural hydraulic hoses, each of which extends rearward from a swivel joint provided to the center frame, are connected to each of the travel motors (for example, see Patent Document 1 and Patent Document 2).

Patent Document 1 discloses a configuration of connecting the hydraulic hose, which extends rearward from the swivel joint, to a hydraulic pipe, which is projected forward from the travel motor, in order to compactly arrange the hydraulic hose connected to the travel motor in a backhoe including variable legs capable of changing a clearance in a right-left direction between the right and left crawler-type travel sections. In the configuration disclosed in Patent Document 1, the hydraulic hose is disposed in a manner to be bent outward in the right-left direction in a rearward extending portion from the center frame.

Patent Document 2 discloses a configuration of providing a restraint member for each of right and left hydraulic hose groups respectively connected to the right and left travel motors. The restraint member is provided on a rear side of the center frame in a mini excavator that includes variable legs as the right and left crawler-type travel sections, and restrains the hydraulic hoses by routing the hydraulic hose group through a frame-like portion. In the configuration disclosed in Patent Document 1, the hydraulic hose extends rearward through a hole that is formed to penetrate a cylindrical portion provided to surround the swivel joint.

PRIOR ART DOCUMENT

Patent Document

Patent Document 1: Japanese Patent Application Publication No. 2002-294743
Patent Document 2: Japanese Patent Application Publication No. 2014-202009

SUMMARY OF INVENTION

Technical Problem

According to the configuration disclosed in Patent Document 1, in the case where such a configuration is applied to a device with a variable leg configuration, for example, in association with an increase/reduction in a distance in the right-left direction between the right and left travel sections (an increase/reduction of the travel section), such a state is likely to occur that any of the hydraulic hoses in each of the right and left hydraulic hose groups is projected to be bulged with respect to the other hydraulic hoses. The projected hydraulic hose is likely to be damaged by repeatedly contacting an edge of the center frame or contacting an obstacle on the ground.

In this regard, according to the configuration disclosed in Patent Document 2, since the right and left hydraulic hose groups are each restrained by the restraint member, it is considered to suppress projection of the hydraulic hose, which is associated with the increase/reduction in the travel section. However, the hole, which is formed in the cylindrical portion surrounding the swivel joint, and the restraint member behind the swivel joint have the same height to restrict the movement of the hydraulic hose. Accordingly, an intermediate portion of the hydraulic hose is likely to be projected to be bulged in either in an up direction or a down direction in association with the increase/reduction in the travel section. For example, the hydraulic hose, which is projected to be bulged upward in association with the reduction in the distance between the travel sections in the right-left direction, is likely to be damaged when contacting a bottom surface of the upper turning body provided above the center frame.

The right and left restraint members disclosed in Patent Document 2 are provided to move rightward and leftward in an integral manner with the travel section in association with the increase/reduction in the travel section. As a result, a structure for restricting the movement of the hydraulic hose becomes complicated. In addition, and smooth operation of the travel section is possibly hindered by entry of dirt or the like into a movable section.

The present invention has been made in view of the problem as described above and therefore has a purpose of providing a construction machine capable of limiting a movement range of a hydraulic hose with a simple configuration and suppressing damage to the hydraulic hose, the hydraulic hose extending from a center frame side in a lower travel body and being connected to a travel motor in respective one of right and left travel sections.

Solution to Problem

A construction machine according to the present invention is a construction machine including: an upper unit; and a lower travel body that supports the upper unit. The lower travel body has: a center frame that supports the upper unit; a side frame that is provided on both of right and left sides of the center frame to support a travel motor and constitutes a crawler-type travel section, around which a crawler track is wound via plural rolling bodies; and plural hydraulic hoses, one end side of each of which is connected to a swivel joint provided to the center frame, and the other end side of each of which is connected to the travel motor. The center frame includes: a wall having an opening, through which the hydraulic hose passes; and a hose guide that is located below the opening, located above the hydraulic hose, and thereby restricts upward movement of the hydraulic hose.

In the construction machine according to another aspect of the present invention, the hose guide is provided at an end on an extension side of the hydraulic hose in the center frame.

In the construction machine according to another aspect of the present invention, the center frame has right and left side walls that form a disposition space for the hydraulic hose, and the hose guide is hung between the right and left side walls.

In the construction machine according to another aspect of the present invention, the center frame has a guide plate section that is provided on the swivel joint side of the hose guide, is located above the hydraulic hose, and thereby restricts the upward movement of the hydraulic hose.

In the construction machine according to another aspect of the present invention, the right and left travel sections are provided to be movable with respect to the center frame in a manner to change a distance therebetween.

Advantageous Effects of Invention

According to the present invention, in regard to the hydraulic hose that extends from the center frame side in the lower travel body and is connected to the travel motor in each of the right and left travel sections, it is possible to limit the movement range of the hydraulic hose with the simple configuration and thus to suppress the damage to the hydraulic hose.

DESCRIPTION OF EMBODIMENTS

In the present invention, a configuration of restricting movement of a hydraulic hose is provided to a configuration in which the hydraulic hose extending from a center frame side is connected to a travel motor in each of travel sections provided on both of right and left sides of the center frame in a lower travel body. In this way, unnecessary movement of the hydraulic hose is suppressed. A description will hereinafter be made on an embodiment of the present invention with reference to the drawings.

In this embodiment, a description will be made on an excavation work machine, which is a turning work vehicle, as an example of the construction machine according to the present invention. However, the construction machine according to the present invention is not limited to the excavation work machine, and can widely be applied to other types of the construction machines such as a bulldozer, a compact track loader, and a skid-steer loader.

First Embodiment

Figure 1:
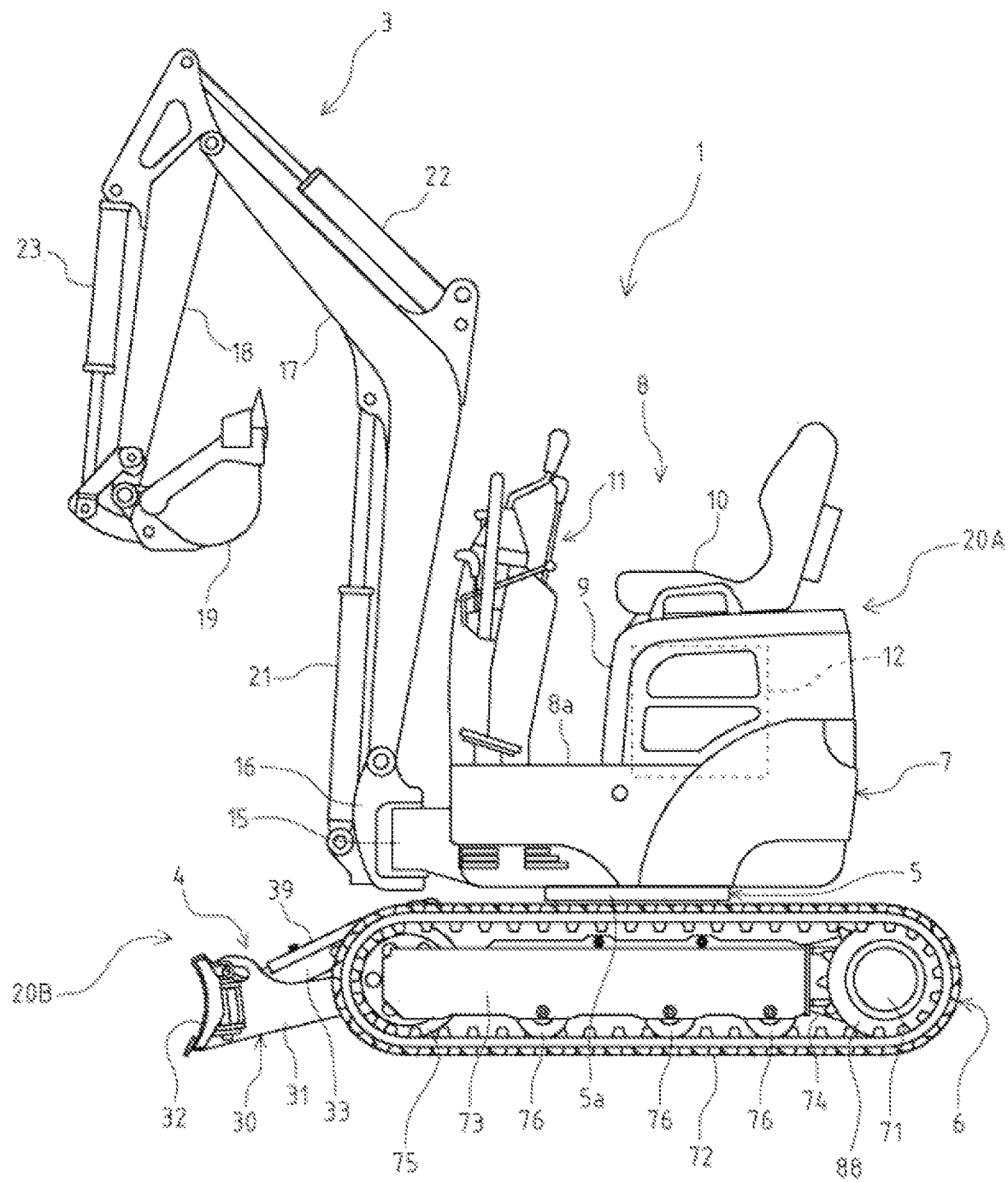
FIG. 1 is a left view of an excavation work machine according to an embodiment of the present invention.

A description will be made on a first embodiment of the present invention. A description will be made on an overall configuration of an excavation work machine 1 according to this embodiment with reference to FIG. 1 to FIG. 4. As illustrated in FIG. 1, the excavation work machine 1 is a so-called mini excavator that is relatively small in size, and includes: a self-propelled travel body; and an excavation unit 3 and an earth removal unit 4, each of which is a work unit attached to the travel body.

The excavation work machine 1 has: a center frame 5 as a travel frame that constitutes a base section in the travel body; a right and left pair of crawler-type travel sections 6, 6 provided on both of right and left sides of the center frame 5; and a turning base 7 provided on the center frame 5. The turning base 7 is configured to have a substantially circular shape in plan view, and is provided to be turnable in either a right direction or a left direction about a vertical axis by a turning support section 5a that is provided in the center frame 5.

A driving section 8 is provided on the turning base 7 to drive/operate the travel sections 6, 6, the excavation unit 3, and the earth removal unit 4. A driver's seat support base 9 as a seat mount is provided in a rear portion on a floor 8a of the driving section 8, and a driver's seat 10 is provided on the driver's seat support base 9.

An operation section 11 is provided in a front portion on the floor 8a of the driving section 8, and is operated by an operator who is seated on the driver's seat 10. The operation section 11 is provided with: a travel operation section including a travel lever, a gearshift pedal, and the like for operating travel of the excavation work machine 1; a work operation section including a work operation lever and the like for operating the excavation unit 3 and the earth removal unit 4; and various operation tools including a lock lever for locking the operation of the work machine, and the like.

The driver's seat support base 9 also serves as a hood, and an engine 12 as a drive source is provided in the driver's seat support base 9. In addition, a fuel tank, a hydraulic oil tank, and the like are provided in the driver's seat support base 9. The fuel tank accommodates fuel for the engine 12, and the hydraulic oil tank accommodates hydraulic oil that is supplied to various hydraulic cylinders and the like provided in the excavation work machine 1.

The excavation unit 3 is a front work unit that is provided on a front side of the excavation work machine 1. A base end portion of the excavation unit 3 is supported by a support bracket 15 via a bracket 16, and the support bracket 15 is provided in a right-left central portion at a front end of the turning base 7. The excavation unit 3 has: a boom 17 that constitutes the base end portion thereof; an arm 18 that is coupled to a tip side of the boom 17; and a bucket 19 that is attached to a tip of the arm 18.

The excavation unit 3 also has: a boom cylinder 21 that rotationally operates the boom 17; and an arm cylinder 22 that rotationally operates the arm 18; and a bucket cylinder 23 that rotationally operates the bucket 19. These cylinders are each configured as the hydraulic cylinder.

The earth removal unit 4 is attached to a front side of the center frame 5. The earth removal unit 4 has: a support frame 30 that includes a right and left pair of arms 31, each of which extends in a front-rear direction, at a position between the right and left travel sections 6, 6; a blade 32 as an earth removal plate that is provided on a tip side of the support frame 30; and a blade cylinder 33 that lifts/lowers the blade 32 via the support frame 30.

Figure 2:
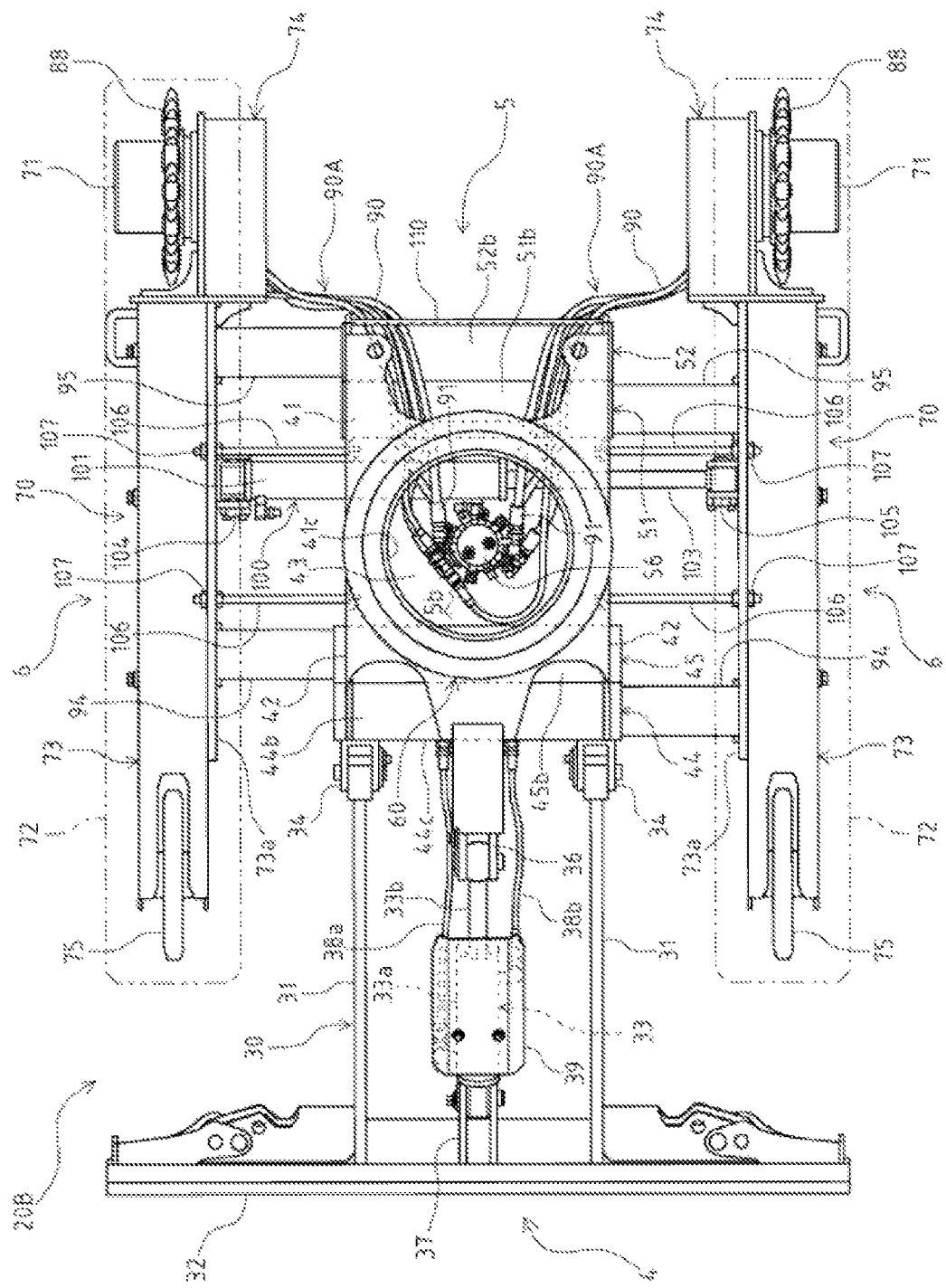
FIG. 2 is a plan view of a lower travel body according to a first embodiment of the present invention.

As illustrated in FIG. 2, rear ends of the right and left arms 31, which constitute the support frame 30, are supported by arm support brackets 34 in a rotatable manner with a right-left direction being a rotation axis direction. The arm support brackets 34 are provided in both of right and left ends of a front surface of the center frame 5. Front ends of the right and left arms 31 are respectively fixed to right and left sides of a right-left intermediate portion on a back surface side of the blade 32. The support frame 30, which supports the blade 32 on the front side just as described, is provided to be rotatably lifted or lowered with respect to the center frame 5.

The blade cylinder 33 is a hydraulic cylinder, and has a cylinder tube 33a and a cylinder rod 33b that has a piston on one end side and is slidably provided in the cylinder tube 33a via the piston. At a position between the right and left arms 31, the blade cylinder 33 is provided such that an expansion/compression direction thereof is set to the front-rear direction in the plan view, and is provided in such an orientation that the cylinder tube 33a side (a bottom side) is set as a front side and the cylinder rod 33b side (a rod side) is set as a rear side.

The blade cylinder 33 is provided in a state of being hung longitudinally between the center frame 5 and the blade 32. More specifically, a rod-side end of the blade cylinder 33 is supported by a body-side support bracket 36 in a rotatable manner with the right-left direction being a rotation axis direction. The body-side support bracket 36 is provided in a right-left central portion at a front end of the center frame 5. In addition, a bottom-side end of the blade cylinder 33 is supported by a blade-side support bracket 37 in a rotatable manner with the right-left direction being a rotation axis direction. The blade-side support bracket 37 is provided in the right-left central portion on the back surface side of the blade 32.

Inside of the cylinder tube 33a is divided by the piston into a bottom-side chamber as a space on the bottom side and a rod-side chamber as a space on the rod side. One end sides of hydraulic hoses 38a, 38b are communicably connected to the bottom-side chamber and the rod-side chamber of the blade cylinder 33, respectively. Through the hydraulic hoses 38a, 38b, the hydraulic oil, which is supplied from the hydraulic oil tank provided on the travel body side (a main machine side), is supplied/discharged into/from the bottom-side chamber and the rod-side chamber, respectively.

In such a configuration, the blade cylinder 33 is expanded/compressed by the supply/discharge of the hydraulic oil into/from each of the bottom-side chamber and the rod-side chamber. With the expansion/compression of the blade cylinder 33, the blade 32 is rotationally lifted/lowered via the support frame 30. A cylinder cover 39 that covers the blade cylinder 33 from above is attached to an upper side of the cylinder tube 33a.

In the excavation work machine 1 that has the configuration as described so far, desired operation or work is performed when the operator who is seated on the driver's seat 10 appropriately operates the travel lever, the work operation lever, or the like. More specifically, by operating the travel lever, for example, the excavation work machine 1 makes forward/rearward linear travel or right/left turn travel. In addition, by operating the work operation lever, excavation work is performed by the excavation unit 3, or earth removal work or leveling work is performed by the earth removal unit 4.

The excavation work machine 1 as a turning work machine includes, as turning components: an upper turning body 20A as an upper unit; and a lower travel body 20B that turnably supports the upper turning body 20A. The upper turning body 20A is mounted on the lower travel body 20B, and is provided to be turnable about a predetermined rotation axis along an up-down direction with respect to the lower travel body 20B.

In the excavation work machine 1 according to this embodiment, the upper turning body 20A is a portion including the turning base 7, the driving section 8 provided on the turning base 7, and the excavation unit 3 provided in front of the turning base 7. The lower travel body 20B is a portion including the center frame 5, the right and left travel sections 6, 6, and the earth removal unit 4 provided in front of the center frame 5.

A description will be made on a configuration of the lower travel body 20B with reference to FIG. 2 to FIG. 7. The lower travel body 20B has: the center frame 5 that supports the upper turning body 20A; and side frames 70 that are provided on both of the right and left sides of the center frame 5. In the lower travel body 20B, the center frame 5 and the right and left side frames 70 are substantially configured to be bilaterally symmetrical.

A description will be made on the center frame 5. The center frame 5 is configured to be schematically box-shaped as a whole, and has a horizontal upper surface 41, right and left vertical side walls 42, and a horizontal bottom surface 43. The upper surface 41 and the right and left side walls 42 are formed of an integral plate-like member. A right-left intermediate portion of the integral plate-like member is used as the upper surface 41, and both of right and left sides thereof are bent downward at right angles and are used as the side walls 42.

A lower front portion of the center frame 5 is constructed of a first front support prism section 44 and a second front support prism section 45 in quadrangular prism shapes that are arranged in parallel in the front-rear direction with the right-left direction being set as a longitudinal direction. The first front support prism section 44 is provided in front, and the second front support prism section 45 is provided behind the first front support prism section 44.

The first front support prism section 44 and the second front support prism section 45 are constructed of quadrangular steel pipes or members in quadrangular steel pipe shapes having the same length and the same size. Then, opposing side surfaces thereof are fixed to each other by welding or the like. Each of the first front support prism section 44 and the second front support prism section 45 is fixed to the right and left side walls 42 by welding or the like in a state where both of right and left ends thereof are fitted to notches 42a that are formed in lower front portions of the right and left side walls 42.

Figure 5:
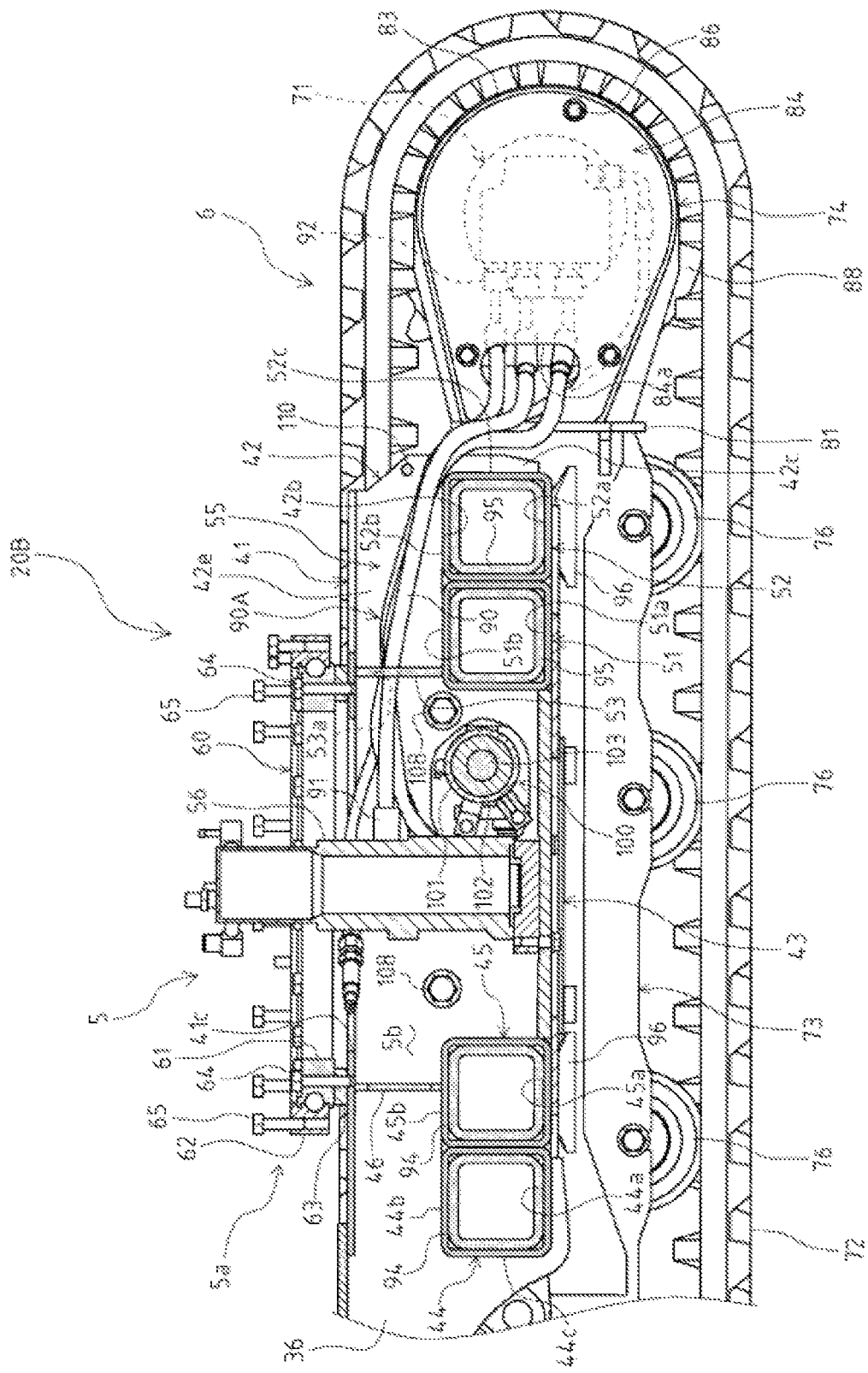
FIG. 5 is a left-side cross-sectional view at a right-left center position in a rear portion of the lower travel body according to the first embodiment of the present invention.

Support holes 44a, 45a, each of which has the quadrangular prism shape and penetrates in the right-left direction, are respectively formed by the first front support prism section 44 and the second front support prism section 45 (see FIG. 5). Lengths of the first front support prism section 44 and the second front support prism section 45 substantially match a right-left width of the center frame 5.

Upper surfaces 44b, 45b of the first front support prism section 44 and the second front support prism section 45 are located to be flush at lower positions than the upper surface 41. In the up-down direction, the upper surfaces 44b, 45b of both of the support prism sections 44, 45 are substantially located at a center height between the upper surface 41 and the bottom surface 43. A rear portion of the body-side support bracket 36, which supports the rear side of the blade cylinder 33, is interposed in a right-left central portion between the upper surface 41 and each of the first front support prism section 44 and the second front support prism section 45, and the body-side support bracket 36 is projected forward from the first front support prism section 44. A front surface 44c of the first front support prism section 44 forms the front surface of the center frame 5.

A vertical front wall 46 is provided between the second front support prism section 45 and the upper surface 41. The front wall 46 is a plate-like portion with the front-rear direction being a plate thickness direction. In the front-rear direction, the front wall 46 is located substantially at a center of an upper surface 45b of the second front support prism section 45, and is provided in a state of being fixed to each of the upper surface 45b of the second front support prism section 45 and a lower surface of the upper surface 41 by welding or the like. In front view, the front wall 46 is provided to completely close a horizontally-long rectangular opening portion that is formed by the upper surface 41, the right and left side walls 42, and the second front support prism section 45.

A lower rear portion of the center frame 5 is constructed of a first rear support prism section 51 and a second rear support prism section 52 in the quadrangular prism shapes that are arranged in parallel in the front-rear direction with a longitudinal direction being the right-left direction. The first rear support prism section 51 is provided in front, and the second rear support prism section 52 is provided behind the first rear support prism section 51.

The first rear support prism section 51 and the second rear support prism section 52 are configured to be symmetrical to the first front support prism section 44 and the second front support prism section 45 in the front-rear direction. That is, the first rear support prism section 51 and the second rear support prism section 52 are constructed of quadrangular steel pipes or members in quadrangular steel pipe shapes having the same length and the same size as the first front support prism section 44 and the like. Then, opposing side surfaces thereof are fixed to each other by welding or the like.

Each of the first rear support prism section 51 and the second rear support prism section 52 is fixed to the right and left side walls 42 by welding or the like in a state where both of right and left ends thereof are fitted to notches 42b that are formed in lower rear portions of the right and left side walls 42. The notch 42b is formed to be recessed in a mode in which a lower side thereof is opened. In this way, in each of the right and left side walls 42, a lower portion at a rear edge of the side wall 42, which serves as a rear side of the notch 42b, also serves as a projection piece 42c that is projected rearward from a rear surface 52c of the second rear support prism section 52.

Support holes 51a, 52a, each of which has the quadrangular prism shape and penetrates in the right-left direction, are respectively formed by the first rear support prism section 51 and the second rear support prism section 52 (see FIG. 5). Lengths of the first rear support prism section 51 and the second rear support prism section 52 substantially match the right-left width of the center frame 5.

Upper surfaces 51b, 52b of the first rear support prism section 51 and the second rear support prism section 52 are located to be flush at the lower positions than the upper surface 41. In the up-down direction, the upper surfaces 51b, 52b of both of the support prism sections 51, 52 are substantially located at the center height between the upper surface 41 and the bottom surface 43. A rear surface 52c of the second rear support prism section 52 forms a rear surface of the center frame 5.

A vertical rear wall 53 is provided between the first rear support prism section 51 and the upper surface 41 in a manner to oppose the front wall 46 in the front-rear direction. The rear wall 53 is a plate-like portion with the front-rear direction being a plate thickness direction. In the front-rear direction, the rear wall 53 is located at a front edge of an upper surface 51b of the first rear support prism section 51, and is provided in a state of being fixed to each of the upper surface 51b of the first rear support prism section 51 and the lower surface of the upper surface 41 by welding or the like. In back view, the rear wall 53 is provided to completely close a horizontally-long rectangular opening portion that is formed by the upper surface 41, the right and left side walls 42, and the first rear support prism section 51.

In a rear portion of the upper surface 41 that is a portion above the first rear support prism section 51 and the second rear support prism section 52, a recess 41a is formed such that a rear side thereof is opened. The recess 41a has a shape that follows a substantially trapezoidal shape in which a right-left width is gradually increased from the front to the rear, and is formed in a mode in which most of the rear portion of the upper surface 41 is cut. In the front-rear direction, a front edge 41b, which is along the right-left direction, in the recess 41a is located above the first rear support prism section 51.

In the configuration of the rear portion of the center frame 5 as described so far, a rear space 55 in a substantially flat rectangular shape whose rear side is opened is formed by the rear portion of the upper surface 41, rear portions of the right and left side walls 42, the upper surfaces 51b, 52b of the first rear support prism section 51 and the second rear support prism section 52, and the rear wall 53. The rear space 55 is a space portion above the first rear support prism section 51 and the second rear support prism section 52, and most of an upper portion thereof is opened by the recess 41a of the upper surface 41.

The bottom surface 43 is constructed of a plate-like member that is provided to seal a space between a pair of the first front support prism section 44 and the second front support prism section 45, which constitute the front portion of the center frame 5, and a pair of the first rear support prism section 51 and the second rear support prism section 52, which constitute the rear portion of the center frame 5, from below. The plate-like member that constitutes the bottom surface 43 is fixed to a lower surface of each of the first front support prism section 44, the second front support prism section 45, the first rear support prism section 51, and the second rear support prism section 52 by welding or the like.

In the center frame 5, a central space 5b whose upper side is opened is formed by the bottom surface 43, the second front support prism section 45, the front wall 46 provided on the second front support prism section 45, the first rear support prism section 51, the rear wall 53 provided on the first rear support prism section 51, and the right and left side walls 42. The upper surface 41 is formed with a circular opening 41*c* for opening the upper side of the central space 5*b*. The opening 41*c* is formed to be concentric with the turning support section 5*a* that follows a circumferential shape in the plan view.

In the central space 5*b* of the center frame 5, a cylindrical swivel joint 56 is vertically provided on the bottom surface 43. The swivel joint 56 is arranged at a center of the bottom surface 43 in a manner to be concentric to the circumferential shape that is the shape of the opening 41*c* of the upper surface 41 in the plan view. The swivel joint 56 has such a height that an upper end thereof is located above the turning support section 5*a* provided on top of the upper surface 41.

The turning support section 5*a* is provided with a turning bearing 60 as a turning support unit for the upper turning body 20A with respect to the lower travel body 20B. That is, the upper turning body 20A is supported to be turnable with respect to the lower travel body 20B via the turning bearing 60. The turning bearing 60 is configured in an annular shape with a predetermined turning axis in the up-down direction, which passes a center of the circumferential shape of the opening 41*c* of the upper surface 41, being a rotation centerline.

The turning bearing 60 has an inner ring 61 and an outer ring 62 in an annular shape that are arranged in a mutually concentric manner and are provided to move relative to each other via a large number of rolling bodies such as steel balls. The inner ring 61 is fixed onto the upper surface 41 at plural positions by bolts 64 via an annular support plate 63 on the upper surface 41. The outer ring 62 is fixed to a predetermined portion of a bottom surface (not illustrated) of the upper turning body 20A at plural positions by bolts 65. When the outer ring 62 rotates relative to the inner ring 61 with a predetermined turning axis being a center, the upper turning body 20A turns with respect to the lower travel body 20B.

The excavation work machine 1 includes a turning motor (not illustrated) as a drive source of the turning support unit. The turning motor is engaged with the inner ring 61 or the outer ring 62 via a gear or the like, and rotationally drives the turning bearing 60. The upper turning body 20A performs turning operation by using drive power of the turning motor. The turning motor is an electric motor or a hydraulic motor, for example.

A description will be made on the side frame 70. The side frame 70 has: a side frame body 73 that constitutes a body portion thereof, and a motor support frame 74 as a portion that supports a travel motor 71. The side frame 70 is a longitudinal frame component with the front-rear direction being a longitudinal direction thereof, and has a longer dimension than the center frame 5 in the front-rear direction.

The side frame body 73 has an upper surface and right and left surfaces, and these surfaces constitute a frame portion whose outer shape is a substantially quadrangular prism shape extending in the front-rear direction. At a front end, the side frame body 73 supports a driven wheel 75 in a freely rotatable manner by a predetermined rotary shaft with the right-left direction being an axial direction.

A lower side of the side frame body 73 is opened, and the side frame body 73 supports plural rolling wheels 76, which are provided at predetermined intervals in the front-rear direction, in a freely rotatable manner by predetermined rotary shafts with the right-left direction being an axial direction of each thereof. In a state where a lower portion of each of the rolling wheels 76 is projected downward from a lower edge of the side frame body 73, each of the rolling wheels 76 is supported between the right and left surfaces of the side frame body 73. In this embodiment, the three rolling wheels 76 are provided.

Figure 6:
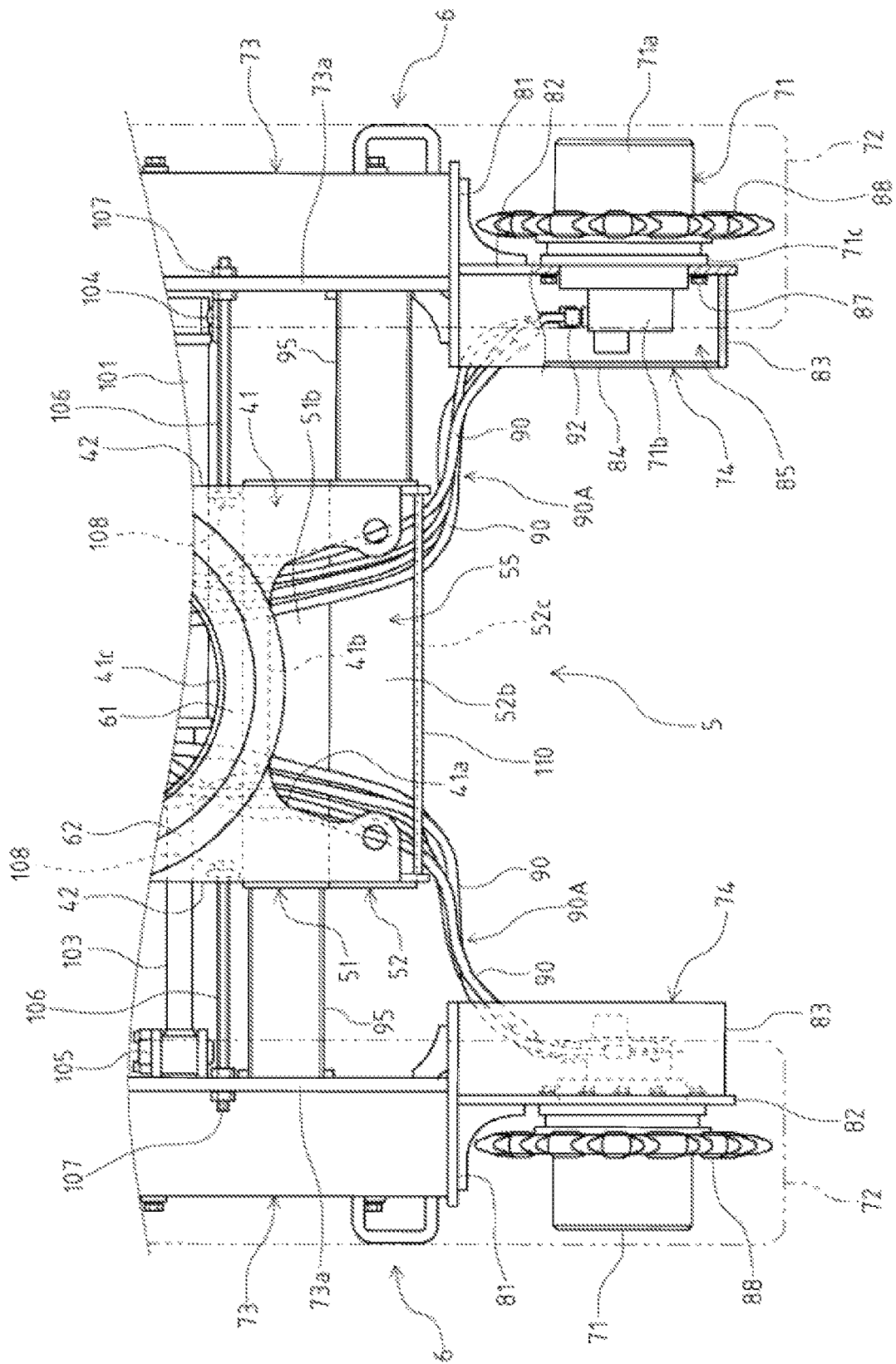
FIG. 6 is a plan view of the rear portion of the lower travel body according to the first embodiment of the present invention.

The motor support frame 74 is provided behind the side frame body 73, and is provided as an integral portion of the side frame body 73. The motor support frame 74 has: an attachment surface 81 that is a fixed portion to the side frame body 73; a motor support surface 82 that is provided behind the attachment surface 81 and supports the travel motor 71; an outer cover 83 that is provided on an inner side in the right-left direction of the motor support surface 82; and an inner surface cover 84 that is provided on the inner side in the right-left direction of the outer cover 83 (see FIG. 6). In FIG. 6, a rear portion of the right motor support frame 74 is illustrated in a notched cross-section.

The attachment surface 81 is a vertical rectangular plate-like portion with the front-rear direction being a plate thickness direction, and is fixed to a rear end of the side frame body 73 by welding or the like. In the attachment surface 81, an inner portion in the right-left direction is projected inward in the right-left direction in comparison with an inner surface 73*a* that is a side surface on the inner side in the right-left direction of the side frame body 73.

The motor support surface 82 is a vertical plate-like portion with the right-left direction being a plate thickness direction and has, as a plate-like shape, a slightly tapered shape whose rear portion follows an arcuate shape and whose front portion has a gradually reduced dimension in the up-down direction from a front side to a rear side. The motor support surface 82 is provided in a state of being fixed at a position in a substantially right-left central portion of the attachment surface 81 in a manner to form a substantial T-shape with the attachment surface 81 in the plan view.

The outer cover 83 is a curved plate-like portion having a shape that follows a plate shape of the motor support surface 82 in side view, and front edges at two upper and lower positions are connected to the attachment surface 81. A space 85 that is opened to the inner side in the right-left direction is formed by the inner portion in the right-left direction of the attachment surface 81, the motor support surface 82, and the outer cover 83 (see FIG. 6).

The inner surface cover 84 is a plate-like member that has substantially the same shape and dimensions as the motor support surface 82, and is provided to close the inner side in the right-left direction of the space 85 in a mode of opposing the motor support surface 82. At plural positions in an outer edge, the inner surface cover 84 is fixed to the outer cover 83 by bolts 86, and is detachably attached to the outer cover 83. Each of the bolts 86 penetrates the inner surface cover 84, and is screwed into a nut, which is not illustrated and is provided on an inner circumference of the outer cover 83.

The travel motor 71 is supported by the motor support frame 74 that is configured as described so far. The travel motor 71 is a hydraulic motor that is driven by the supply and the discharge of the hydraulic oil, and has: a motor body 71*a* that has a substantially cylindrical outer shape; and a hose connection section 71*b* that is provided on one side in a center axis direction of the motor body 71*a* (see FIG. 6).

The travel motor 71 is provided in a state of penetrating the motor support surface 82 in such an orientation that the center axis direction of the motor body 71*a* is set in the right-left direction and the hose connection section 71*b* is located on an inner side in the right-left direction. A flange 71*c* that is provided to the motor body 71*a* is fixed at plural positions to the motor support surface 82 by bolts 87. In this way, the travel motor 71 is provided in a state of being fixed to the motor support surface 82 (See FIG. 6).

In the travel motor 71, the hose connection section 71b is located in the space 85, and a large portion of the motor body 71a is located on an outer side in the right-left direction of the motor support surface 82. A drive wheel 88 is rotatably provided to the motor body 71a of the travel motor 71. The drive wheel 88 is provided in a portion of the motor body 71a that is located on the outer side in the right-left direction of the motor support surface 82, and rotates with the right-left direction being a rotation axis direction when receiving the drive power of the travel motor 71. The drive wheel 88 is a sprocket, and a crawler track 72 is wound around the drive wheel 88 together with the driven wheel 75 and the plural rolling wheels 76. In this way, the drive power is applied to the crawler track 72.

As it has been described so far, the side frame 70 supports the travel motor 71, and constitutes the crawler-type travel section 6 by winding the rubber crawler track 72 therearound via the driven wheel 75, the plural rolling wheels 76, and the drive wheel 88 as plural rotary bodies. In each of the right and left travel sections 6, the drive wheel 88 is rotationally driven by the drive power of the travel motor 71, and the travel section 6 is thereby driven to travel.

Plural hydraulic hoses 90, each of which extends rearward from the center frame 5 side to supply/discharge the hydraulic oil, are communicably connected to the travel motor 71. In this embodiment, the four hydraulic hoses 90 are connected to each of the travel motors 71. The four hydraulic hoses 90 are: two hydraulic hoses (an advancement hydraulic hose and a reverse hydraulic hose) for supplying the hydraulic oil to cause rotation of the travel motor 71; a hydraulic hose (a return oil hose) for drainage from the travel motor 71; and a pilot oil hose. The hydraulic hose 90 is configured by winding a steel wire around an outer side of a hose body that is made of rubber or resin, for example, and is flexible.

One end side of each of the hydraulic hoses 90 is connected to the swivel joint 56 provided in the center frame 5. The one end side of each of the hydraulic hoses 90 is communicably connected to a connection port, which is provided in a predetermined portion of a circumferential wall of the swivel joint 56, via a joint member 91.

The other end side of each of the hydraulic hoses 90 is connected to either one of the right and left travel motors 71. The other end side of each of the hydraulic hoses 90 is communicably connected to a connection port, which is provided in a predetermined portion of the hose connection section 71b of the travel motor 71, via a joint pipe 92. The hose connection section 71b is a portion that is projected from the motor body 71a to have a substantially cuboid projected shape, and the other end side of the hydraulic hose 90 is connected to a front surface, an upper surface, or a lower surface of the hose connection section 71b via the joint pipe 92.

A total of the eight hydraulic hoses 90, each of which is connected to respective one of the right and left travel motors 71, is disposed to extend from the swivel joint 56, which is vertically provided in the central space 5b of the center frame 5, and passes through the central space 5b. Then, four each of the eight hydraulic hoses 90 are divided into right and left bundles, penetrate the rear wall 53, and extend rearward. Furthermore, the right and left bundles of the hydraulic hoses 90 respectively expand rightward and leftward from the front to the rear toward the right and left travel motors 71, which are located on the outer sides in the right-left direction of the center frame 5.

The rear wall 53 has a guide hole 53a as an opening through which the hydraulic hose 90 passes. The guide hole 53a is a through hole that communicates between the central space 5b and the outside, and is formed at two symmetrical positions on both sides in the right-left direction of the rear wall 53. The guide hole 53a is a long hole with the right-left direction being a longitudinal direction, and is formed on both of right and left sides of an intermediate portion in the right-left direction of an upper portion of the rear wall 53. A hydraulic hose group 90A, which includes the four hydraulic hoses 90 connected to the respective travel motor 71, penetrates the respective guide hole 53a.

Each of the right and left hydraulic hose groups 90A penetrates the inner surface cover 84 and is connected to the hose connection section 71b of the respective travel motor 71. A hole 84a, through which the hydraulic hose group 90A passes, is formed in a front end of the inner surface cover 84.

As it has been described so far, the lower travel body 20B has the plural (eight in this embodiment) hydraulic hoses 90, one end of each of which is connected to the swivel joint 56 provided in the center frame 5, and the other end of each of which is connected to respective one of the right and left travel motors 71.

Each of the hydraulic hoses 90, which connects between the swivel joint 56 and the travel motor 71 just as described, has: a portion located in the central space 5b where the swivel joint 56 is provided; a portion located in the rear space 55 formed in the rear portion of the center frame 5; and a rear extending portion that extends rearward from the rear space 55 and is connected to the travel motor 71. The rear extending portion of the hydraulic hose 90 includes: a portion that extends rearward from the rear space 55 and is exposed to the outside; and a portion that is located in the space 85 where the hose connection section 71b of the travel motor 71 is provided.

The hose connection section 71b, to which the other end of the hydraulic hose 90 is connected, in the travel motor 71 is located below and on the outer side in the right-left direction of the guide hole 53a in the rear wall 53. Accordingly, the right and left hydraulic hose groups 90A, which respectively extend rearward from the right and left guide holes 53a, are disposed to gradually expand outward from the inner side in the right-left direction from the front to the rear in the plan view (see FIG. 2). In addition, the right and left hydraulic hose groups 90A, which respectively extend rearward from the right and left guide holes 53a, are disposed to gradually expand outward from the inner side in the right-left direction from the upper side to the lower side in the back view (see FIG. 3).

In detail, as illustrated in FIG. 6, a front portion of each of the right and left hydraulic hose groups 90A is an inclined portion that is inclined outward from the inner side in the right-left direction within the rear space 55. In addition, a rear portion of each of the right and left hydraulic hose groups 90A is a curved portion that is curved to run behind respective one of upper right and left corners in the rear surface 52c and extend toward the travel motor 71 located on the outer side in the right-left direction in the rear view. Such a mode of the right and left hydraulic hose groups 90A is realized in a state where the right and left travel sections 6, each of which is configured as a variable leg as will be described below, increase a distance therebetween.

The hydraulic oil is discharged from an actuator drive pump and a pilot pump, each of which is provided in the upper turning body 20A and mechanically coupled to the engine 12, via a control valve and a gearshift solenoid valve, flows through the swivel joint 56, and is supplied to each of the right and left travel motors 71 by the oil supply hydraulic hoses 90 included in the hydraulic hose group 90A. In this way, the right and left travel motors 71 are driven, and then the excavation work machine 1 makes the forward/rearward linear travel or the right/left turning travel by the right and left travel sections 6. The oil discharged from the travel motor 71 is returned to the hydraulic oil tank, which is arranged in the upper turning body 20A, via the swivel joint 56 by the hydraulic hose 90 for drainage. The gearshift solenoid valve for the travel motor 71 is operated by a gearshift operator such as a first/second gearshift switch provided in the operation section 11.

In the lower travel body 20B, the right and left travel sections 6 are configured as the variable legs capable of changing the distance therebetween in the right-left direction. More specifically, the right and left side frames 70 constituting the travel sections 6 are coupled to and supported by the center frame 5 in a manner capable of moving in parallel in the right-left direction, and are configured to change the distance in a width direction (the right-left direction) between the right and left travel sections 6 by changing positions in the right-left direction of the side frames 70.

Each of the side frames 70 is accommodated and supported in a manner to be movable in the right-left direction with respect to the center frame 5 by two front and rear support legs 94, 95. Each of the support legs 94, 95 is constructed of a quadrangular steel pipe or a member in the quadrangular steel pipe shape, has the right-left direction as a longitudinal direction thereof, has ends on the outer side in the right-left direction that are fixed to the inner surface 73a of the side frame body 73 by welding or the like, and is inserted and fitted into a support prism section (44, 45, 51, 52), which constitutes the center frame 5, in a slidingly movable manner. At a position below a portion of each of the support legs 94, 95 connected to the inner surface 73a, a support projection piece 96, which supports respective one of the support legs 94, 95 from below, is projected from the inner surface 73a (see FIG. 5).

A total of the four support legs 94, 95 provided to the right and left side frames 70 is alternately inserted and fitted into the four support prism sections (44, 45, 51, 52) provided to the center frame 5. That is, the front support leg 94 for the left side frame 70 is inserted and fitted into the first front support prism section 44 while the rear support leg 95 for the left side frame 70 is inserted and fitted into the first rear support prism section 51. In addition, the front support leg 94 for the right side frame 70 is inserted and fitted into the second front support prism section 45 while the rear support leg 95 for the right side frame 70 is inserted and fitted into the second rear support prism section 52.

A distance between the right and left side frames 70 varies by expansion/compression operation of a hydraulic cylinder 100 for the variable legs that is hung between the right and left side frames 70. The hydraulic cylinder 100 has: a cylinder tube 101; and a cylinder rod 103 that has a piston 102 (see FIG. 5) on one end side and is slidably provided in the cylinder tube 101 via the piston 102. At a position between the right and left side frames 70, the hydraulic cylinder 100 sets the right-left direction as the expansion/compression direction thereof, and is provided in such an orientation that the cylinder tube 101 side (a bottom side) is set as a right side and the cylinder rod 103 side (a rod side) is set as a left side.

An end portion on the bottom side of the hydraulic cylinder 100 is supported by the inner surface 73a of the right side frame 70 via a support bracket 104, and an end portion on the rod side thereof is supported by the inner surface 73a of the left side frame 70 via a support bracket 105. The hydraulic cylinder 100 is located behind the swivel joint 56 in the front-rear direction, and is provided in a state of penetrating the turning support section 5a through an opening 42d (see FIG. 4) that is formed in each of the right and left side walls 42.

Inside of the cylinder tube 101 is divided by the piston 102 into a bottom-side chamber as a space on the bottom side and a rod-side chamber as a space on the rod side. One end side of the hydraulic hose is communicably connected to each of the bottom-side chamber and the rod-side chamber of the hydraulic cylinder 100. Through the hydraulic hose, the hydraulic oil, which is supplied from the hydraulic oil tank provided in the upper turning body 20A, is supplied/discharged into/from respective one of the bottom-side chamber and the rod-side chamber. In such a configuration, the hydraulic cylinder 100 is expanded/compressed by the supply/discharge of the hydraulic oil into/from each of the bottom-side chamber and the rod-side chamber.

In addition, two front and rear stopper rods 106 are provided between the center frame 5 and each of the right and left side frames 70 so as to restrict movement of the right and left side frames 70 in an expanding direction. An outer end side in the right-left direction of each of the stopper rods 106 is fixed to an upper edge of the inner surface 73a of the side frame body 73 by a fixing member 107 such as a nut.

Each of the stopper rods 106 penetrates the side wall 42, and the other end side thereof on the inner side in the right-left direction is located in the central space 5b. An end on the other end side of the stopper rod 106 is provided with a locking section 108 that is a portion whose diameter is increased from that in a round rod-like body portion. The stopper rod 106 locks the locking section 108 from the inner side with respect to the side wall 42, and thereby restricts outward movement in the right-left direction of the side frame 70 with respect to the center frame 5 at a predetermined position.

With the configuration as described so far, the distance in the width direction between the right and left travel sections 6 can be increased or reduced, and the expansion/compression operation of the hydraulic cylinder 100 switches between a state where the distance between the right and left travel sections 6 is increased to open the right and left travel sections 6 and a state where the distance between the right and left travel sections 6 is reduced to close the right and left travel sections 6. Accordingly, in the excavation work machine 1, the right and left travel sections 6, 6 are provided to be movable with respect to the center frame 5 so as to change the distance therebetween.

Opening/closing of the right and left travel sections 6 is switched by using the operation tool, such as a variable leg operation lever, that is provided in the operation section 11 according to a work location by the excavation work machine 1, and the like. Here, the excavation work machine 1 has a configuration of a small rear turning type such that, in the turning operation of the upper turning body 20A, a rear end of the turning base 7 fits into the width between the right and left travel sections 6 in the closed state.

In the excavation work machine 1 having the configuration as described so far, the plural hydraulic hoses 90, each of which is connected to respective one of the right and left travel motors 71, vibrate due to vibration of the machine body during work or travel, or are deformed or move in association with opening/closing operation of the right and left travel sections 6. As a configuration to limit a movement range of the hydraulic hose 90 against the vibration or the deformation/movement of each of the plural hydraulic hoses 90, the excavation work machine 1 has the following configuration.

That is, in the excavation work machine 1, the center frame 5 includes: the rear wall 53 as a wall having the guide hole 53*a*, through which the plural hydraulic hoses 90 pass; and a hose guide 110 as a guide member that is located below the guide hole 53*a*, is located above the plural hydraulic hoses 90, and thereby restricts upward movement of each of the hydraulic hoses 90.

Figure 3:
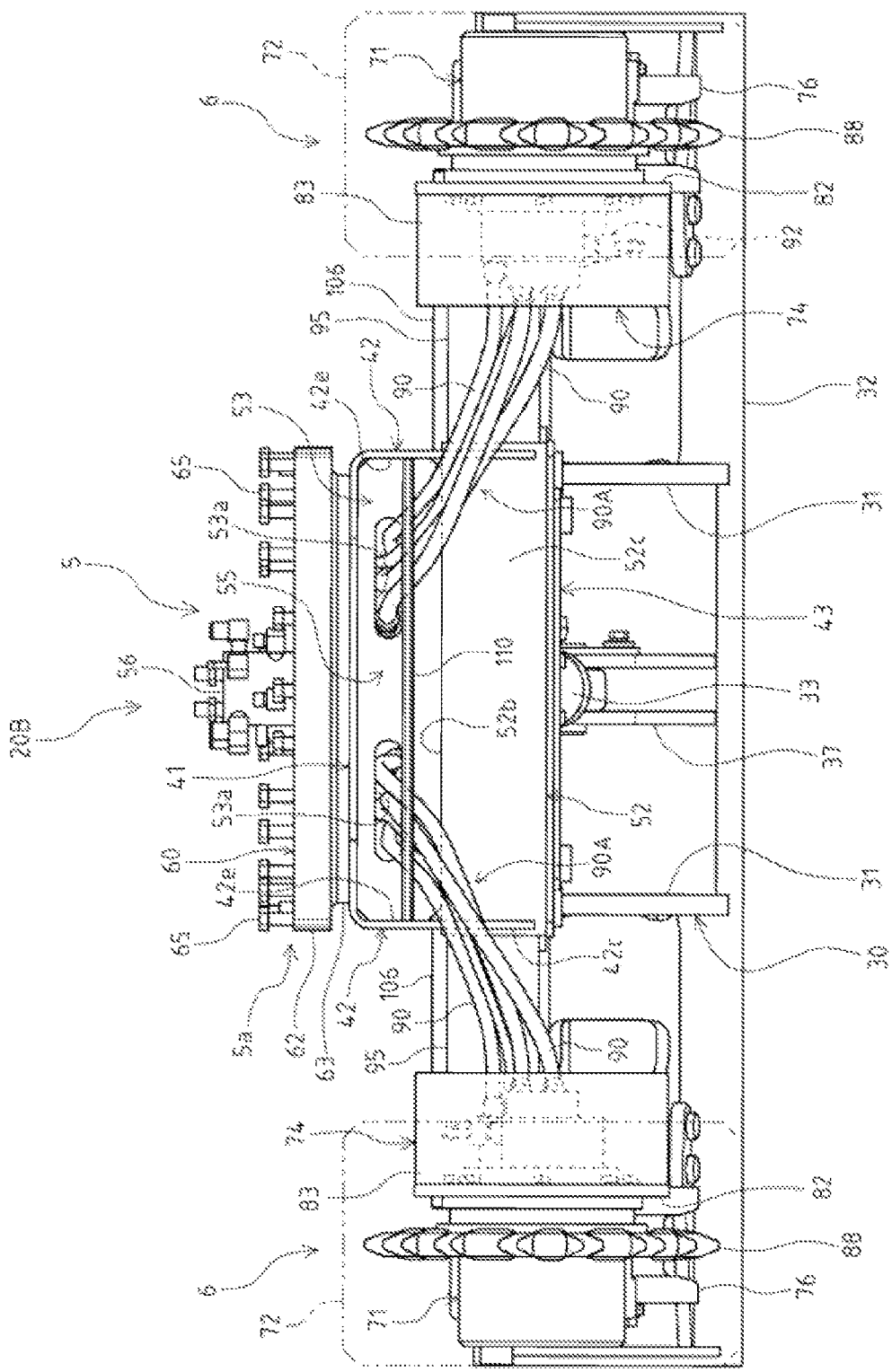
FIG. 3 is a back view of the lower travel body according to the first embodiment of the present invention.
Figure 4:
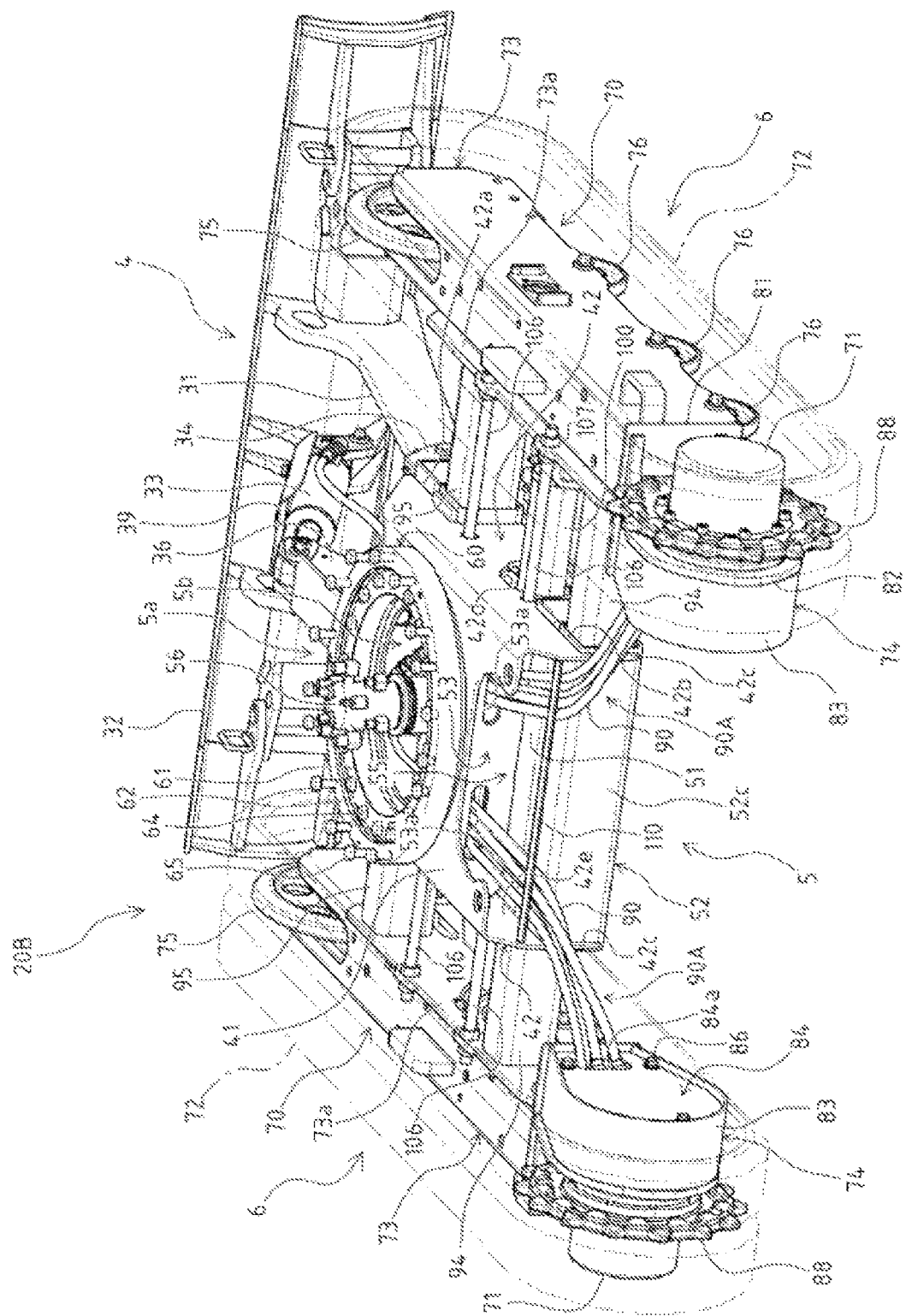
FIG. 4 is a rear perspective view of the lower travel body according to the first embodiment of the present invention.

In the rear wall 53, the four hydraulic hoses 90 in a substantially transversely arranged state pass through respective one of the right and left guide holes 53*a*, each of which is formed as transversely long holes (see FIG. 3). That is, a dimension in the up-down direction (a short direction) of the guide hole 53*a* is smaller than twice a diameter of the hydraulic hose 90. Of the four hydraulic hoses 90, portions located in the guide hole 53*a* and portions near and in front of/behind the guide hole 53*a* do not overlap each other vertically and are substantially arranged side-by-side in a lateral direction.

The hose guide 110 is a linear rod-like portion provided below and behind the guide hole 53*a*, and is provided at a predetermined position in such an orientation that the right-left direction is set as a longitudinal direction thereof. The hose guide 110 is provided by fixing a linear round rod-like member with a circular cross-sectional shape to a predetermined portion of the center frame 5. For example, the hose guide 110 has an outer diameter dimension that is substantially the same as an outer diameter of the hydraulic hose 90. In regard to the outer diameter of the hose guide 110, from a perspective of suppressing the hydraulic hose 90 from getting caught on the hose guide 110, the outer diameter dimension of the hose guide 110 is preferably larger than a winding pitch of the steel wire that is wound around an outer circumference of the hydraulic hose 90.

In the up-down direction, the hose guide 110 is located below the guide hole 53*a*, which is formed in the upper portion of the rear wall 53. In other words, a height position of an upper edge of the hose guide 110 is a lower position than an upper edge of the guide hole 53*a*. In addition, in the up-down direction, the hose guide 110 is located below a center position of the rear wall 53 in the up-down direction. In this embodiment, in the up-down direction, the height position of the upper edge of the hose guide 110 is about the same height as a lower edge of the guide hole 53*a* (see FIG. 3).

In regard to the support configuration of the hose guide 110, the center frame 5 has the following configuration. In other words, the center frame 5 has the right and left side walls 42 that form the rear space 55 as a disposition space for the hydraulic hoses 90, and the hose guide 110 is hung between the right and left side walls 42.

Both of right and left ends of the rod-shaped member, which constitutes the hose guide 110, are fixed to inner wall surfaces 42*e* of the side walls 42 by welding. However, a structure of fixing the rod-shaped member, which constitutes the hose guide 110, to the side walls 42 is not particularly limited, and a structure using a fixture such as a bolt or the like may be adopted. In addition, the rod-shaped member, which constitutes the hose guide 110, is not limited to the round rod, but may be one with an oval transverse cross-sectional shape or a polygonal transverse cross-sectional shape such as a quadrilateral shape or a hexagonal shape.

In regard to the arrangement position of the hose guide 110, the hose guide 110 is provided to an end of the center frame 5 on the extension side of the hydraulic hose 90. In this embodiment, the extension side of the hydraulic hose 90 in the center frame 5 is the rear side, and the hose guide 110 is provided in the rear end of the center frame 5.

More specifically, the hose guide 110 is supported at a position in an upper portion of the rear edge of each of the right and left side walls 42, which support the hose guide 110. That is, as illustrated in FIG. 5, the hose guide 110 is provided in a state of being supported at the position above the rearward projection piece 42*c* from the rear surface 52*c* of the second rear support prism section 52.

In detail, an upper side of the rear edge of the side wall 42 is an inclined side portion that is inclined downward to the rear, and the hose guide 110 is located near a corner at an obtuse angle that is defined by this inclined side portion and a vertical side section constituting the projection piece 42*c*. The support position of the hose guide 110 is located above a rear upper corner of the second rear support prism section 52. In the front-rear direction, such a support position of the hose guide 110 is located behind a rear end edge of the upper surface 41.

In regard to the hose guide 110 that is provided in an upper portion of the rear edge of the rear space 55 in the center frame 5 as described so far, the right and left hydraulic hose groups 90A are routed in a mode of ducking under the hose guide 110. In other words, the right and left hydraulic hose groups 90A run through a clearance between an upper rear corner of the second rear support prism section 52 and the hose guide 110, and extends to the rear of the center frame 5.

Accordingly, the right and left hydraulic hose groups 90A, each of which extends rearward from the guide hole 53*a* located at the higher position than the hose guide 110 in the up-down direction, are disposed to be inclined downward to the rear in the rear space 55, duck under the hose guide 110, expand outward in the right-left direction while being further inclined downward to the rear at positions behind the hose guide 110, and are connected to the respective travel motors 71. Just as described, in the front-rear direction, portions of the plural hydraulic hoses 90 behind the rear wall 53 are inclined downward to the rear. In a disposition portion of the hose guide 110, the hose guide 110 is positioned above the plural hydraulic hoses 90.

According to the excavation work machine 1 of this embodiment having the configuration as described so far, in regard to the hydraulic hose 90 that extends from the center frame 5 side in the lower travel body 20B and is connected to the travel motor 71 in respective one of the right and left travel sections 6, it is possible to limit the movement range of the hydraulic hose 90 by the simple configuration, and it is thus possible to suppress the damage to the hydraulic hose 90.

In the excavation work machine 1, the center frame 5 has: the rear wall 53 having the guide hole 53*a*, through which the hydraulic hose 90 passes; and the hose guide 110 located behind and below the rear wall 53. According to such a configuration, since the hydraulic hose 90 contacts the hose guide 110, the hydraulic hose 90 is restricted from moving above the hose guide 110, and thus the hydraulic hose 90 can be restrained. In this way, in regard to the extending portion of the hydraulic hose 90 behind the rear wall 53, it is possible to prevent the hydraulic hose 90 from moving above the guide hole 53*a* in association with the vibration of the machine body or the opening/closing operation of the right and left travel sections 6.

In particular, since the hose guide 110 is provided at the lower position than the guide hole 53a, it is possible to effectively suppress the hydraulic hose 90 from moving above the guide hole 53a. Therefore, it is possible to suppress the damage to the hydraulic hose 90, which occurs when the hydraulic hose 90 is projected and deformed in a manner to be bulged upward in association with the reduction in the distance between the right and left travel sections 6 and then contacts the bottom surface of the upper turning body 20A, for example.

In addition, in the center frame 5, the hose guide 110 can be provided as the linear rod-shaped portion, for example, by the simple configuration without changing the configurations of the right and left travel sections 6 and the like. In this way, as the component to restrict the upward movement of the hydraulic hose 90, which is connected to the travel motor 71, the hose guide 110 can also easily be provided to the existing configuration.

In the excavation work machine 1 according to this embodiment, the right and left travel sections 6 have the configuration as the variable legs capable of changing the distance between the right and left travel sections 6. In such a configuration, for example, in association with the reduction in the distance between the right and left travel sections 6, any of the hydraulic hoses 90 in each of the right and left hydraulic hose groups 90A attempts to be deflected in a manner to be bulged upward with respect to the other hydraulic hoses 90. However, due to presence of the rear wall 53 and the hose guide 110, it is possible to limit the movement range of the hydraulic hose 90.

In particular, since the hydraulic hose 90 runs through the clearance between the second rear support prism section 52 and the hose guide 110 and extends rearward, it is possible to suppress the upward or downward deflection of the hydraulic hose 90, which is caused by the reduction in the distance between the right and left travel sections 6. In this way, it is possible to release the right and left hydraulic hose groups 90A to the center side of the machine body.

Figure 7:
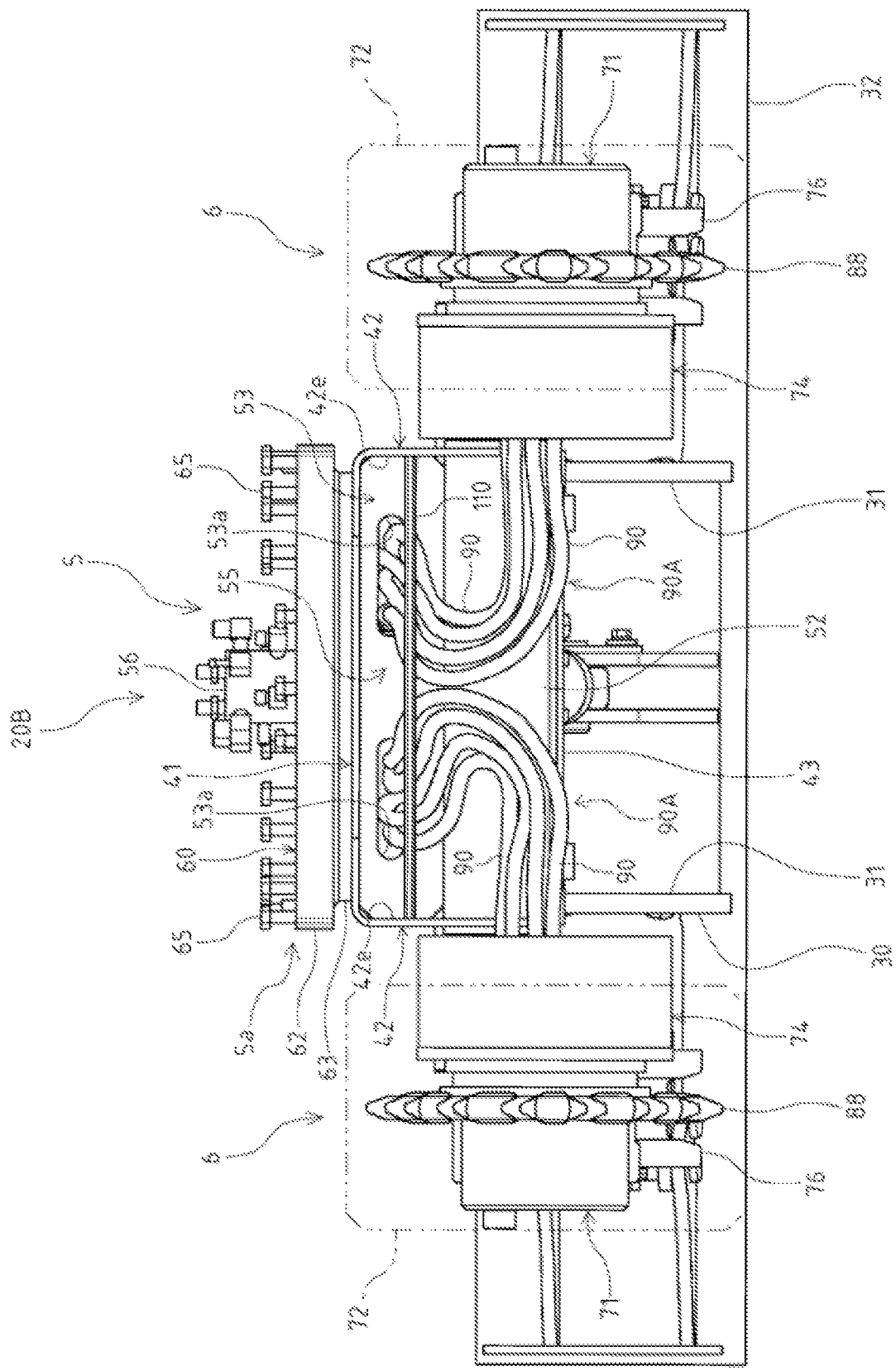
FIG. 7 is a back view illustrating a state of reducing a clearance between right and left travel sections according to the first embodiment of the present invention.

As illustrated in FIG. 3, in the increased state of the distance between the right and left travel sections 6, each of the right and left hydraulic hose groups 90A is in a state of being gently expanded from the upper side to the lower side in the rear view. As illustrated in FIG. 7, when the distance between the right and left travel sections 6 is reduced from the state illustrated in FIG. 3, it is possible to limit the vertical movement ranges of the right and left hydraulic hose groups 90A by the rear wall 53 and the hose guide 110, and it is also possible to deflect the right and left hydraulic hose groups 90A to be projected inward in the right-left direction, so as to be released to the center side of the machine body.

As illustrated in FIG. 7, in the reduced state of the distance between the right and left travel sections 6, the right and left hydraulic hose groups 90A are deflected to gather in the right-left central portion near the hose guide 110, and are curved to define a so-called substantial X-shape. In other words, from the front to the rear, the right and left hydraulic hose groups 90A respectively extend from the right and left guide holes 53a, gradually advance to the right-left central portion side, come close to each other in the portion near the hose guide 110, and thereafter extend toward the travel motors 71 in a mode of being folded outward in the right-left direction.

Just as described, the movement range of each of the right and left hydraulic hose groups 90A in the up-down direction is limited. As a result, it is possible to suppress the hydraulic hose 90 from contacting the bottom surface of the upper turning body 20A, contacting the edge of the center frame 5, and contacting an obstacle on the ground. Thus, it is possible to prevent the damage to the hydraulic hose 90.

The hose guide 110 is provided in the rear end of the center frame 5. With such a configuration, it is possible to expand an area where the hydraulic hose 90, which is deflected in association with the reduction in the distance between the right and left travel sections 6, and the like, can be released. In other words, since the hose guide 110 is provided at the position away from the rear wall 53, it is possible to expand the range where the movement of the hydraulic hose 90 caused by the deflection or the like can be limited, and it is thus possible to easily secure a space for allowing the deflection of the hydraulic hose 90, the upward movement of which is limited by the hose guide 110.

In particular, in this embodiment, as a portion that serves as the lower surface of the rear space 55, through which the plural hydraulic hoses 90 extending rearward from the rear wall 53 pass, the first rear support prism section 51 and the second rear support prism section 52, into which the rear support legs 95 of the right and left side frames 70 are inserted and fitted to be supported, are arranged in the front-rear direction. With such a configuration, since the hose guide 110 can easily be provided at the position away from the rear wall 53 to the rear, it is possible to expand the range where the movement of the hydraulic hose 90 caused by the deflection or the like can be limited, and it is thus possible to effectively expand the area where the deflection of the hydraulic hose 90 can be released.

In addition, the hose guide 110 is provided in a state of being transversely hung between the right and left side walls 42 of the center frame 5. With such a configuration, for example, when the distance between the right and left travel sections 6 is increased, it is possible to prevent the hydraulic hose 90 from sticking out to the outside of the center frame 5 by the right and left side walls 42. In this way, it is possible to protect the hydraulic hose 90.

In this embodiment, the hose guide 110 is provided as the round rod-shaped portion. With such a configuration, since an edge can be removed from the hose guide 110, with which the hydraulic hose 90 comes into contact, it is possible to suppress the damage to the hydraulic hose 90.

In this embodiment, in the rear wall 53, the guide hole 53a, through which the hydraulic hose 90 passes, is formed as the transversely long hole. With such a configuration, since the plural (four) hydraulic hoses 90, which pass the respective guide hole 53a, can be arranged side by side, it is possible to reduce the vertical dimension of the center frame 5 and thus to make the machine body compact.

Figure 8:
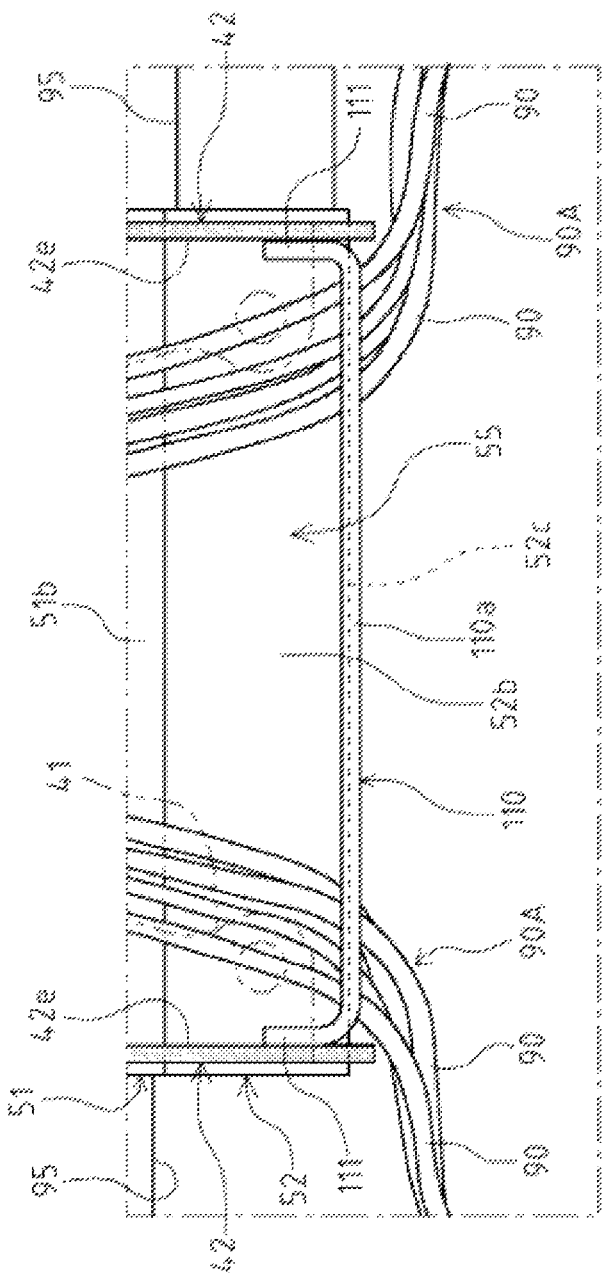
FIG. 8 is a plan view illustrating a modified example of a hose guide according to the first embodiment of the present invention.
Figure 9:
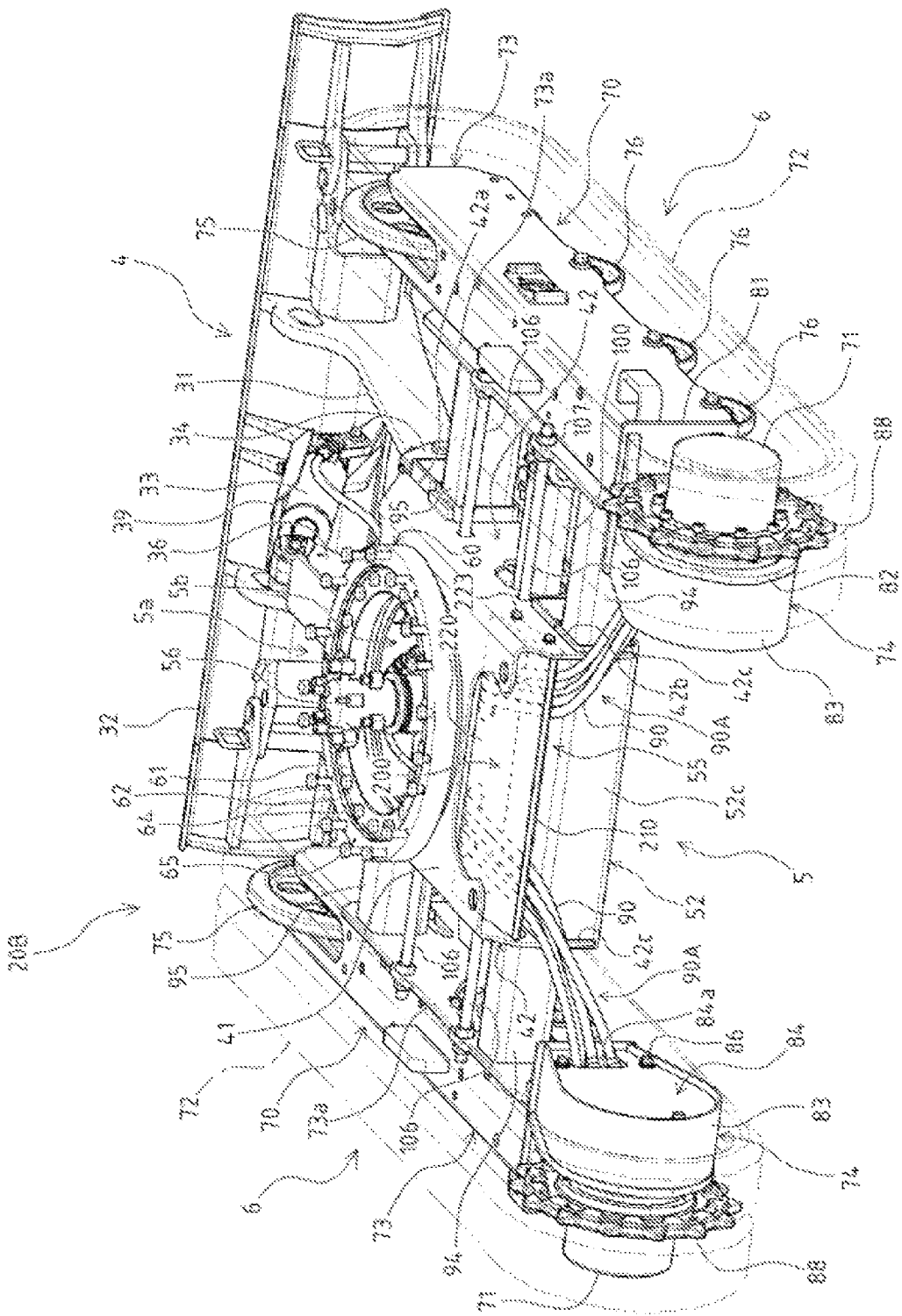
FIG. 9 is a rear perspective view of a lower travel body according to a second embodiment of the present invention.
Figure 10:
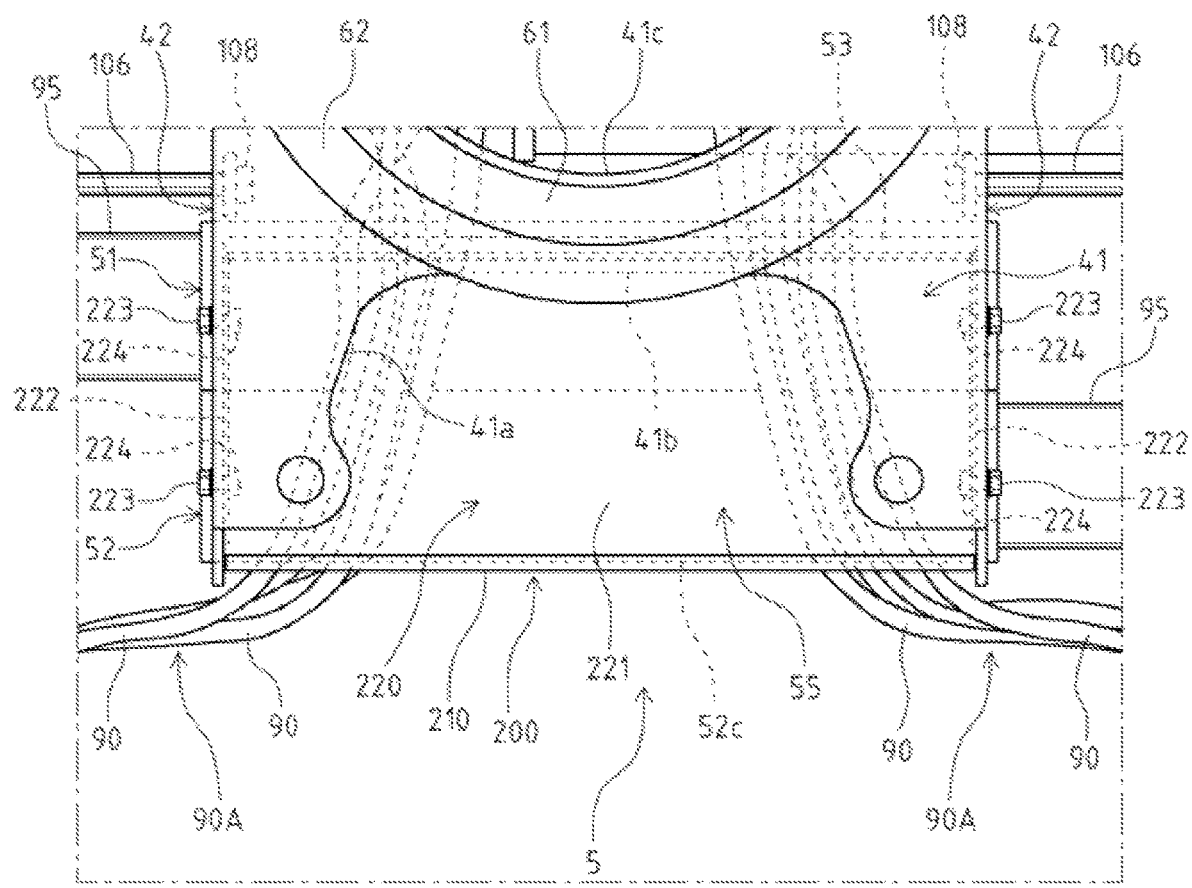
FIG. 10 is a partial enlarged plan view of a rear portion of the lower travel body according to the second embodiment of the present invention.
Figure 11:
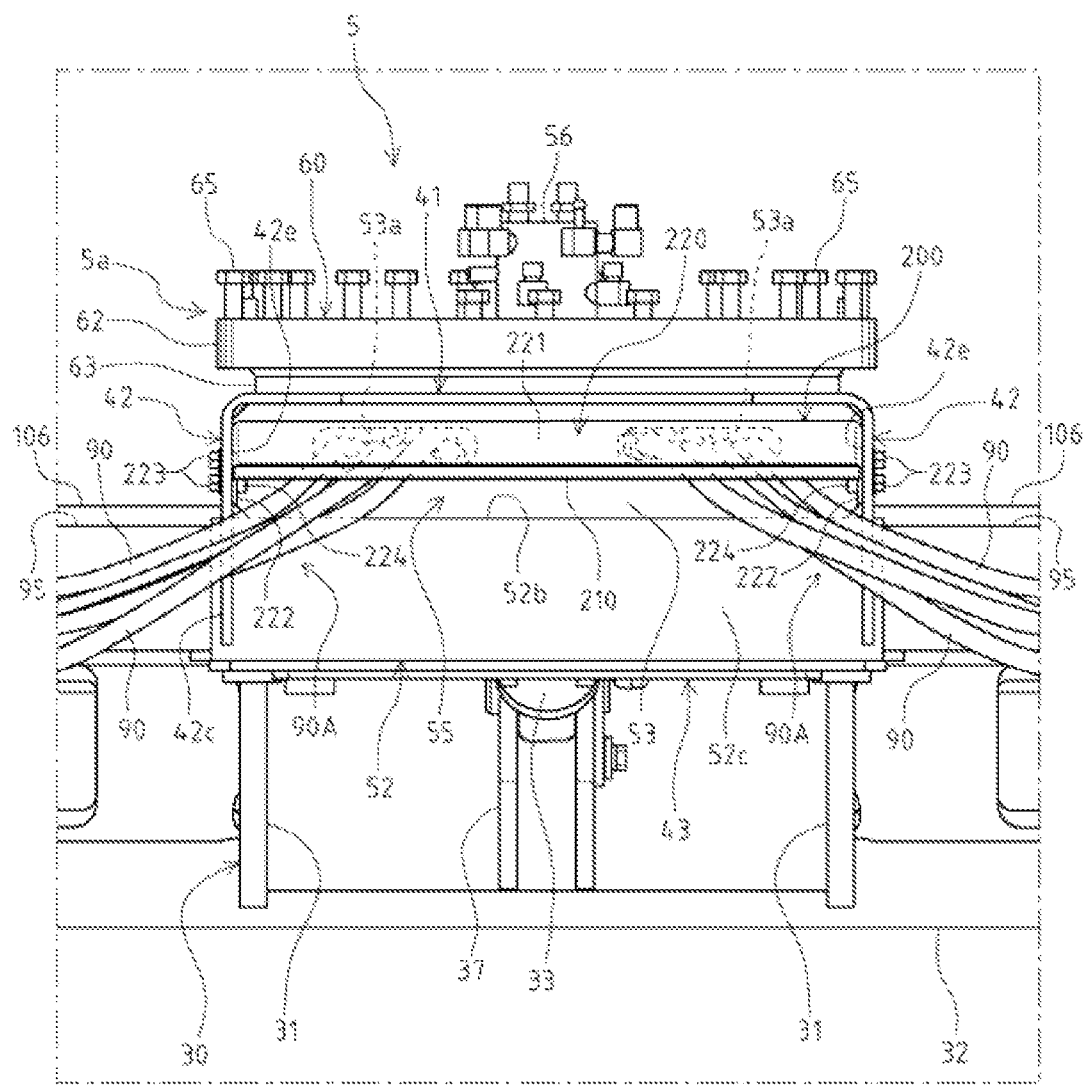
FIG. 11 is a partial enlarged back view of the lower travel body according to the second embodiment of the present invention.
Figure 12:
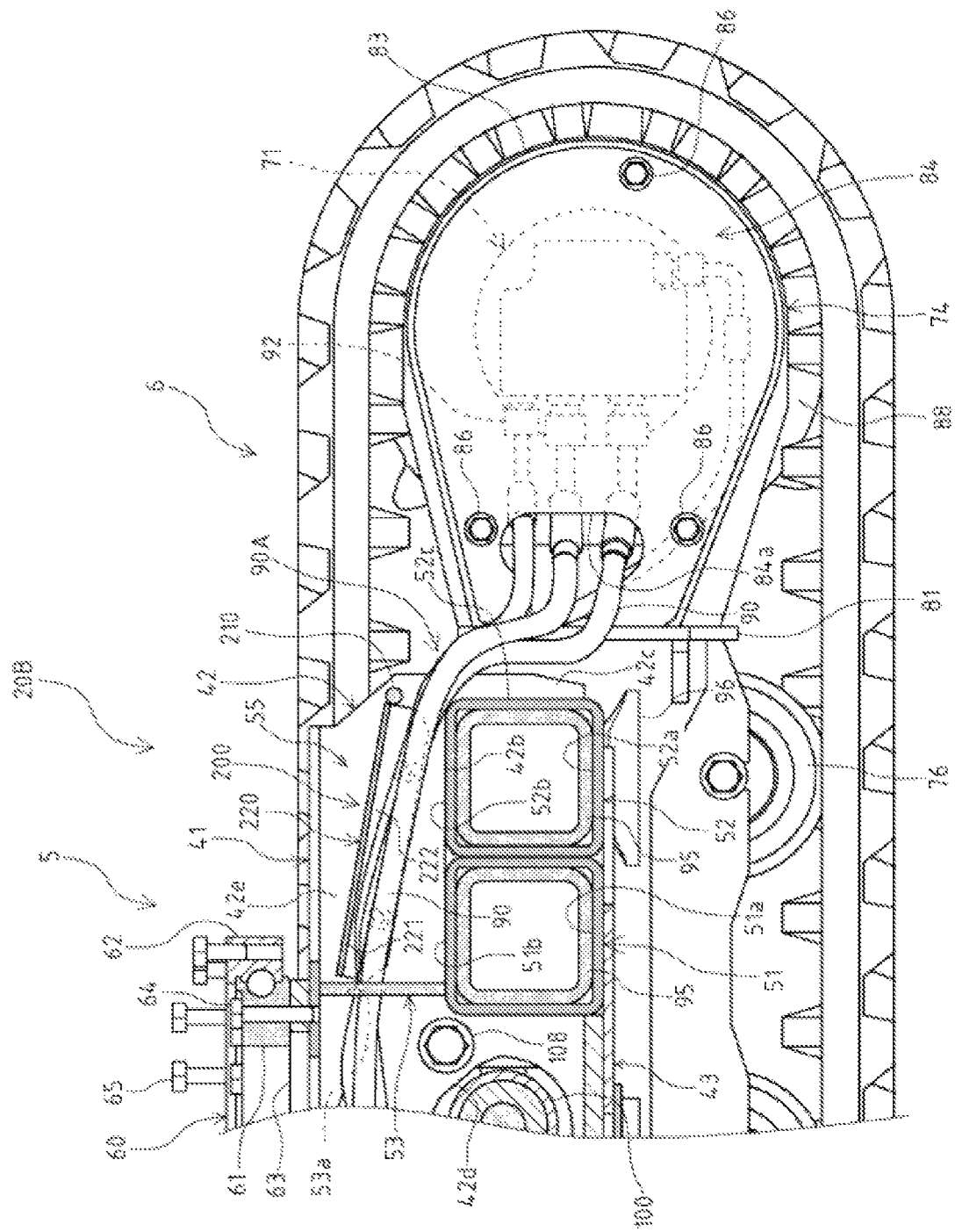
FIG. 12 is a left-side cross-sectional view at a right-left central position in the rear portion of the lower travel body according to the second embodiment of the present invention.

The hose guide 110 may have a fixture portion in a predetermined shape at each of the ends fixed to the right and left side walls 42. More specifically, for example, as in a modified example illustrated in FIG. 8, the hose guide 110 may have a bent section 111 in each of right and left ends, and the bent section 111 is a fixed to the side wall 42.

The bent section 111 is a portion of the hose guide 110 that is bent rearward in a manner to define a right angle with a linear body portion 110a, and the body portion 110a is hung between the right and left side walls 42 along the right-left direction. The bent section 111 is the linear portion along the inner wall surface 42e of the side wall 42. The bent section 111 is a portion that is fixed to the side wall 42 by welding. The hose guide 110, which has the bent sections 111 on the right and left sides just as described, is constructed of the integral rod-shaped member, both ends of which are folded.

With such a configuration that the bent sections 111 are provided at the right and left ends of the hose guide 110, just as described, it is possible to reliably fix the hose guide 110 to the right and left side walls 42. However, the fixing structure of the bent section 111 to the side wall 42 is not particularly limited, and may be a structure using a fixture such as a bolt.

In this embodiment, the hose guide 110 is the linear rod-shaped portion. However, the shape of the hose guide 110 is not particularly limited. For example, the hose guide 110 may be a bent or curved rod-shaped portion or a bent or curved plate-shaped portion.

Second Embodiment

A description will be made on a second embodiment of the present invention with reference to FIG. 9 to FIG. 14. Components that are common to those in the first embodiment will be denoted by the same reference signs, and the description thereon will appropriately be omitted. In this embodiment, a configuration to limit the movement range of the hydraulic hose 90 differs from that in the first embodiment.

As illustrated in FIG. 9 to FIG. 14, the center frame 5 according to this embodiment has a hose guide section 210 as a hose guide and a plate-shaped guide plate section 220.

Similar to the hose guide 110 according to the first embodiment, the hose guide section 210 is constructed of a linear rod-shaped member. Similar to the hose guide 110, the hose guide section 210 is provided in a state of being located below the guide hole 53a of the rear wall 53 and being located between the right and left side walls 42 at the rear end of the center frame 5.

The guide plate section 220 is provided in front of the hose guide section 210, that is, the swivel joint 56 side, is located above the plural hydraulic hoses 90, and thereby restricts the upward movement of the hydraulic hoses 90. The guide plate section 220 is constructed of a substantially rectangular plate-shaped member, and is provided to be located above the right and left hydraulic hose groups 90A in the rear space 55. In other words, each of the right and left hydraulic hose groups 90A passes through a space below the guide plate section 220 and the hose guide section 210, and extends rearward.

The guide plate section 220 is provided below the upper surface 41 and has an entirely flat surface. In the right-left direction, the guide plate section 220 is provided in the entire range between the right and left side walls 42. In addition, a rear edge of the guide plate section 220 is brought close to the rear side of the rear wall 53. In the front-rear direction, the guide plate section 220 is provided in the substantially entire range between the rear wall 53 and the hose guide section 210. In the front-rear direction, the rear edge of the guide plate section 220 is located behind the rear end edge of the upper surface 41.

The guide plate section 220 covers the entire recess 41a, which is formed in the rear portion of the upper surface 41, from below. That is, the guide plate section 220 is large enough to encompass an entire formation portion of the recess 41a of the upper surface 41, and is provided to seal the entire recess 41a of the upper surface 41 from below in the plan view.

The guide plate section 220 is provided to be inclined downward to the rear. The inclination of the guide plate section 220 is such an inclination that follows the downward and rearward inclination of the hydraulic hose 90, which extends rearward from the guide hole 53a and ducks under the hose guide section 210. In other words, the guide plate section 220 is inclined rearward in a manner to correspond to a height relationship between the guide hole 53a and the hose guide section 210. An inclination angle in the front-rear direction of the guide plate section 220 with respect to the horizontal direction is approximately 10°, for example.

In the up-down direction, the guide plate section 220 is provided to cover the entire or substantially entire guide hole 53a of the rear wall 53 in the back view. In other words, in the up-down direction, a front edge end of the guide plate section 220, which is provided to be inclined rearward as described above, is located higher than the upper edge of the guide hole 53a, and the rear edge thereof is located in the substantially same height as the lower edge of the guide hole 53a. The guide plate section 220 is provided in a state where the front edge as an upper edge thereof is located below the upper surface 41 and the entire guide plate section 220 is separated from the upper surface 41 with a space being interposed therebetween.

Figure 13:
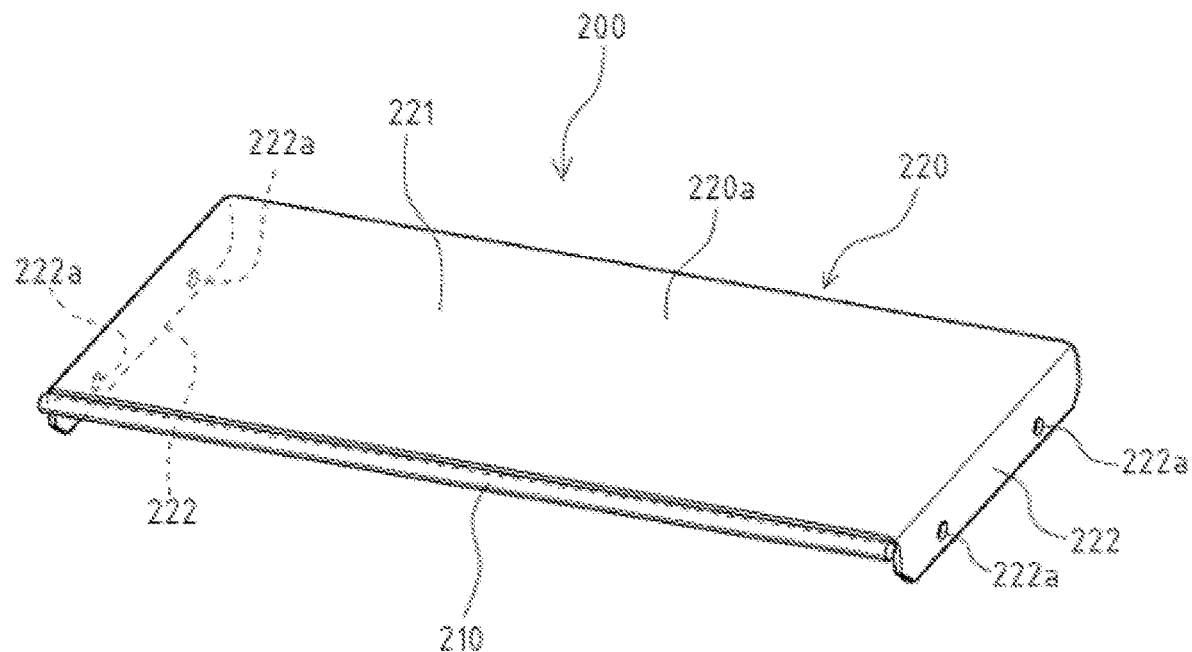
FIG. 13 is a perspective view of a guide member according to the second embodiment of the present invention.
Figure 14:
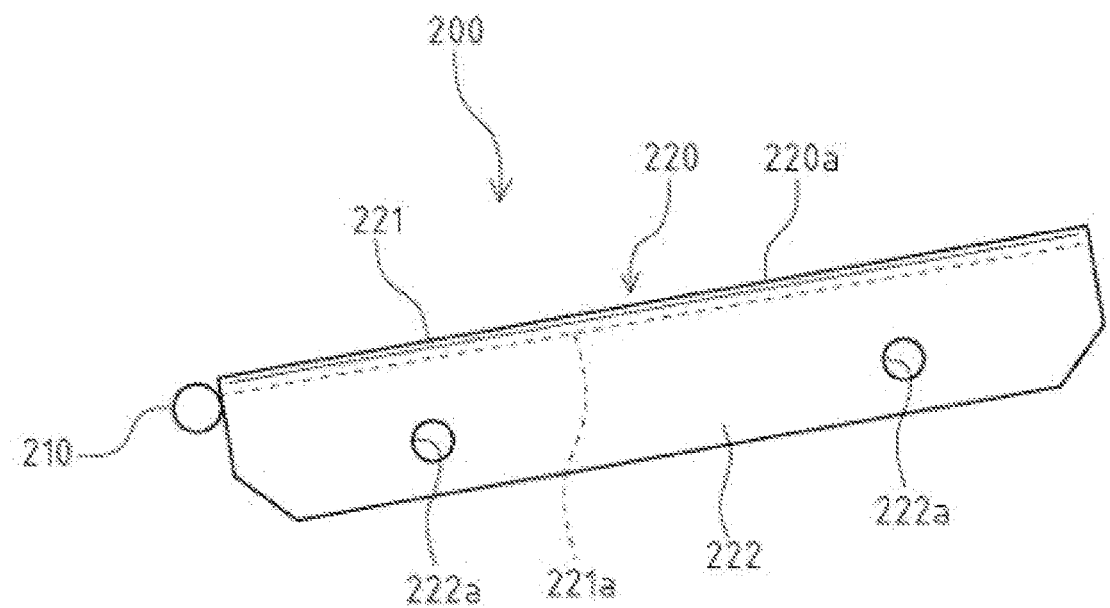
FIG. 14 is a right view of the guide member according to the second embodiment of the present invention.

As illustrated in FIG. 13 and FIG. 14, together with the hose guide section 210, the guide plate section 220 constitutes an integral guide member 200. In the guide member 200, the hose guide section 210 is provided by fixing a straight round rod-shaped member, which has a circular transverse cross-sectional shape, to the rear end edge of the plate-shaped member constituting the guide plate section 220 by welding.

For example, the hose guide section 210 has substantially the same outer diameter dimension as the hydraulic hose 90. A thickness (plate thickness) of the guide plate section 220 is less than the diameter of the hose guide section 210. The thickness of the guide plate section 220 is about ⅓ of the diameter of the hose guide section 210, for example. In the side view, in regard to the guide plate section 220, the hose guide section 210 is provided to locate the upper edge end thereof on an extension line of an upper surface 220a of the guide plate section 220 to the rear.

The hose guide section 210 and the guide plate section 220 have substantially the same length in the right-left direction. The length in the right-left direction of each of the hose guide section 210 and the guide plate section 220 is substantially the same dimension as the dimension between the right and left side walls 42.

The guide member 200 is attached to the center frame 5 by fixing the guide plate section 220 to the right and left side walls 42. The guide plate section 220 has a bent surface 222 on each of right and left edges, and the bent surface 222 is a fixed portion to respective one of the right and left side walls 42.

The bent surface 222 is a portion that is bent downward from a flat body surface 221 of the guide plate section 220 in a manner to define a right angle with the body surface 221. The bent surface 222 is a planar portion along the inner wall surface 42e of the side wall 42 and is a narrower portion than the body surface 221. The guide plate section 220, which has the bent surface 222 on each of the right and left sides just as described, is constructed of an integral plate-shaped member, both edges of which are folded. In the guide plate section 220, a lower surface 221a of the body surface 221 is a surface on the disposition side of the hydraulic hose 90, and is a surface with which the hydraulic hose 90 comes into contact when the hydraulic hose 90 is deflected upward.

The guide plate section 220 is fixed to the side wall 42 by a fixing bolt 223, which is inserted in the side wall 42 and screwed thereto from the outside in the right-left direction of the side wall 42 in a state where each of the right and left bent surfaces 222 is superposed on respective one of the right and left side walls 42 from the inner wall surface 42e side. Two fixing portions by the fixing bolts 223 are provided longitudinally for each of the right and left bent surfaces 222. Each of the bent surfaces 222 is formed with holes 222a, through each of which the fixing bolt 223 is inserted, at two positions in the front-rear direction. In addition, in each of the right and left side walls 42, two holes (not illustrated), through each of which the fixing bolt 223 is inserted, are formed in the front-rear direction at positions corresponding to the holes 222a.

The fixing bolt 223 is inserted through the side wall 42 and the bent surface 222, and is screwed into a nut 224 that is located on the inner side of the bent surface 222. The nut 224 may be a portion that is provided by fixing a nut-like member to an inner surface of the bent surface 222 by welding or the like, or may be a separate member from the bent surface 222.

Since the guide plate section 220 is fixed to the right and left side walls 42, just as described, the integral guide member 200 is attached to the center frame 5. As a part of the guide member 200, the hose guide section 210 is provided with the guide plate section 220, and is not directly fixed to the right and left side walls 42.

In the configuration that the guide plate section 220 has the right and left bent surfaces 222, a portion, to which the rod-shaped member constituting the hose guide section 210 is welded, in the plate-shaped member constituting the guide plate section 220 is at least one of a rear edge of the body surface 221 and upper portions of rear edges of the right and left bent surfaces 222. In other words, the rod-shaped member constituting the hose guide section 210 is welded to one or both of a portion of the body surface 221 and a portion of the bent surface 222 in the guide plate section 220.

According to the excavation work machine 1 of this embodiment having the configuration as described so far, it is possible to effectively limit the movement range of the hydraulic hose 90 and thus to suppress the damage to the hydraulic hose 90.

Since the center frame 5 has the hose guide section 210 and the guide plate section 220, the hose guide section 210 and the guide plate section 220 restrict the upward movement of the hydraulic hose 90. Thus, it is possible to constrain the hydraulic hose 90. In this way, in regard to the rearward extending portion of the hydraulic hose 90 from the rear wall 53, it is possible to reliably suppress the upward deflection of the hydraulic hose 90, which is associated with the vibration of the machine body or the opening/closing operation of the right and left travel sections 6, and it is thus possible to effectively protect the hydraulic hose 90.

Each of the right and left hydraulic hose groups 90A passes through a space between a pair of the first rear support prism section 51 and the second rear support prism section 52 and a pair of the guide plate section 220 and the hose guide section 210, and extends rearward. Accordingly, it is possible to effectively suppress the upward or downward deflection of the hydraulic hose 90, which occurs by the reduction in the distance between the right and left travel sections 6, and it is thus possible to reliably release the right and left hydraulic hose groups 90A to the center side of the machine body.

Since the center frame 5 has the guide plate section 220, the guide plate section 220 can cover the right and left hydraulic hose groups 90A from above. Thus, it is possible to protect the right and left hydraulic hose groups 90A against dirt, a stone, rainwater, and the like from the outside. In particular, in this embodiment, since upper, lower, right, and left sides of the rear space 55 are covered with the first rear support prism section 51, the second rear support prism section 52, the right and left side walls 42, the upper surface 41, and the guide plate section 220, it is possible to effectively protect the portion of the hydraulic hose 90 that is located in the rear space 55.

Since, together with the hose guide section 210, the guide plate section 220 is configured as the integral guide member 200, it is possible to easy attach/detach the guide member 200 to/from the center frame 5. Accordingly, maintenance of the hydraulic hose 90 and the like can easily be performed.

Since, together with the hose guide section 210, the guide plate section 220 is configured as the integral guide member 200, there is no need to perform welding and the like for the hose guide section 210, and thus the hose guide section 210 can easily be provided.

Since the guide plate section 220 is provided, in the center frame 5, the right and left hydraulic hose groups 90A can be covered from above. In this way, it is possible to reduce the portion of each of the right and left hydraulic hose groups 90A that is exposed to the outside, and it is thus possible to improve design of external appearance of the excavation work machine 1.

The guide plate section 220 is provided to be inclined downward to the rear. With such a configuration, it is possible to suppress rainwater, water for washing the machine body, the dirt, or the like from being accumulated on the guide plate section 220.

In this embodiment, the rod-shaped member, which constitutes the hose guide section 210, and the plate-shaped member, which constitutes the guide plate section 220, are fixed to each other by welding. However, these members may be fixed by a method other than welding. In addition, in this embodiment, together with the hose guide section 210, the guide plate section 220 is provided by the integral guide member 200. However, the configuration of the hose guide section 210 and the guide plate section 220 is not limited to such a configuration. It may be configured that the guide plate section 220 and the hose guide section 210 are fixed as mutually separate components to the right and left side walls 42, and the like.

In this embodiment, the right and left side walls 42 are the fixed portions of the guide member 200 in the center frame 5. However, portions other than the side walls 42 may be used as the fixed portions of the guide member 200.

In this embodiment, the guide plate section 220 is provided to be inclined rearward. However, the guide plate section 220 may be provided horizontally, or may be provided to be inclined forward, for example. In this embodiment, the guide plate section 220 is provided below the upper surface 41. However, but the guide plate section 220 may be provided above the upper surface 41.

The description of the above-described embodiment merely constitutes one example of the present invention, and the construction machine according to the present invention is not limited to the above-described embodiment. Accordingly, it is needless to say that various modifications can be made even to those other than the above-described embodiment according to the design and the like within the scope that does not depart from the technical idea of the present invention. The effects described in the present disclosure are merely illustrative and are not limited, and other effects may also be exerted. The configuration in each of the above-described embodiments and the configuration in the modified example can appropriately be combined.

REFERENCE SIGNS LIST

1 Excavation work machine (construction machine)
5 Center frame

6 Travel section
20A Upper turning body (upper unit)
20B Lower travel body
41 Upper surface
42 Side wall
53 Rear wall (wall)
53a Guide hole (opening)
55 Rear space
56 Swivel joint
70 Side frame
71 Travel motor
72 Crawler track
75 Driven wheel
76 Rolling wheel
88 Drive wheel
90 Hydraulic hose
90A Hydraulic hose group
100 Hydraulic cylinder
110 Hose guide
200 Guide member
210 Hose guide section
220 Guide plate section

The invention claimed is:

1. A construction machine comprising:
an upper unit; and
a lower travel body that supports the upper unit, wherein the lower travel body has:
a center frame that supports the upper unit;
a side frame that is provided on both of right and left sides of the center frame to support a travel motor and constitutes a crawler-type travel section, around which a crawler track is wound via plural rolling bodies;
a plurality of hydraulic hoses, one end side of each of which is connected to a swivel joint provided to the center frame, and the other end side of each of which is connected to the travel motor, wherein the center frame includes a wall having an opening, through which the hydraulic hose passes;
a hose guide that is located below the opening, and located over and above the hydraulic hoses, and restricts upward movement of the hydraulic hoses above the center frame and
a rear surface of the center frame, the rear surface being displaced below from the wall and projected downwardly below the wall, and the hydraulic hose passing bare and exposed between the hose guide and the rear surface.

2. The construction machine according to claim 1, wherein
the hose guide is provided at an end on an extension side of the hydraulic hoses in the center frame.

3. The construction machine according to claim 1, wherein the center frame has right and left side walls that form a disposition space for the hydraulic hoses, and
the hose guide is hung between the right and left side walls.

4. The construction machine according to claim 1, wherein
the center frame has a guide plate section that is provided on the swivel joint side of the hose guide, is located above the hydraulic hoses, and thereby restricts the upward movement of the hydraulic hoses.

5. The construction machine according to claim 1, wherein
the travel section includes right and left travel sections which are provided to be movable with respect to the center frame in a manner to change a distance between the right and left travel sections.

6. A construction machine comprising:
an upper unit; and
a lower travel body that supports the upper unit, wherein the lower travel body has:
a center frame that supports the upper unit;
a side frame that is provided on both of right and left sides of the center frame to support a travel motor and constitutes a crawler-type travel section, around which a crawler track is wound via plural rolling bodies;
a plurality of hydraulic hoses, one end side of each of which is connected to a swivel joint provided to the center frame, and the other end side of each of which is connected to the travel motor, wherein the center frame includes a wall having an opening, through which the hydraulic hose passes; and
a hose guide that is located below the opening, and located over and above the hydraulic hoses, such that a height position of an upper edge of the hose guide is a lower position than an upper edge of the opening to restrict upward movement of the hydraulic hoses above the center frame and
a rear surface of the center frame, the rear surface being displaced below from the wall and projected downwardly below the wall, and the hydraulic hose passing bare and exposed between the hose guide and the rear surface.

7. A construction machine comprising:
an upper unit; and
a lower travel body that supports the upper unit, wherein the lower travel body has:
a center frame that supports the upper unit;
a side frame that is provided on both of right and left sides of the center frame to support a travel motor and constitutes a crawler-type travel section, around which a crawler track is wound via plural rolling bodies;
a plurality of hydraulic hoses, one end side of each of which is connected to a swivel joint provided to the center frame, and the other end side of each of which is connected to the travel motor, wherein the center frame includes a wall having an opening, through which the hydraulic hose passes;
a hose guide that is located below the opening, and located over and above the hydraulic hoses, and restricts upward movement of the hydraulic hoses above the center frame and
a rear surface of the center frame, the rear surface being displaced below from the wall and projected downwardly below the wall, and the hydraulic hose passing bare and exposed between the hose guide and the rear surface;
wherein
the hose guide is a linear rod-like portion disposed on the center frame by fixing ends of the hose guide to right and left side walls of the center frame.

* * * * *